US008751548B2

(12) United States Patent
Hara

(10) Patent No.: US 8,751,548 B2
(45) Date of Patent: Jun. 10, 2014

(54) DATA PROCESSING APPARATUS AND METHOD THEREOF, AND INFORMATION PROCESSING APPARATUS AND METHOD THEREOF

(75) Inventor: Kenichiroh Hara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1230 days.

(21) Appl. No.: 12/160,691

(22) PCT Filed: Mar. 23, 2007

(86) PCT No.: PCT/JP2007/057026
§ 371 (c)(1),
(2), (4) Date: Jul. 11, 2008

(87) PCT Pub. No.: WO2007/119602
PCT Pub. Date: Oct. 25, 2007

(65) Prior Publication Data
US 2010/0299374 A1    Nov. 25, 2010

(30) Foreign Application Priority Data
Mar. 31, 2006 (JP) .................................. 2006-100396

(51) Int. Cl.
*G06F 17/30* (2006.01)

(52) U.S. Cl.
USPC ..................................... 707/822; 707/E17.01

(58) Field of Classification Search
CPC .................... G06F 17/30781; G06F 17/30784; G06F 17/277; G06F 15/16; G06F 17/2247; G06F 17/30038; G06F 17/30153; G06F 17/30247; G06F 17/3028; G06F 17/3087; G06F 3/0481
See application file for complete search history.

(56) References Cited

U.S. PATENT DOCUMENTS

| 6,711,637 | B2 |   | 3/2004  | Tateyama ........................ 710/65 |
| 6,784,925 | B1 | * | 8/2004  | Tomat et al. ............. 348/207.11 |
| 7,730,043 | B1 | * | 6/2010  | Bourdev ........................ 707/695 |
| 7,751,628 | B1 | * | 7/2010  | Reisman ........................ 382/232 |
| 2001/0043799 | A1 | * | 11/2001 | Okada et al. ..................... 386/95 |
| 2002/0135608 | A1 | * | 9/2002  | Hamada et al. ................ 345/723 |
| 2003/0091333 | A1 |   | 5/2003  | Kotani et al. ................... 389/69 |
| 2004/0047615 | A1 | * | 3/2004  | Itoh .............................. 386/111 |
| 2006/0269147 | A1 | * | 11/2006 | Shen et al. .................... 382/232 |
| 2007/0110328 | A1 | * | 5/2007  | Okada et al. .................. 382/251 |
| 2007/0252896 | A1 |   | 11/2007 | Hatanaka et al. .......... 348/207.1 |

FOREIGN PATENT DOCUMENTS

| JP | 2000-082023 | 3/2000 |
| JP | 2000-082026 | 3/2000 |
| JP | 2001-195208 | 7/2001 |

(Continued)

OTHER PUBLICATIONS

PCT International Search Report in Application No. PCT/JP2007/057026 issued Jul. 24, 2007.

*Primary Examiner* — Shyue Jiunn Hwa
(74) *Attorney, Agent, or Firm* — Fitzpatrick, Cella, Harper & Scinto

(57) ABSTRACT

As an embodiment of the present invention, a data processing apparatus stores as cache data, in a RAM, data included in a predetermined fixed length area of a stored file. The PC sends a transfer request for cache data to the data processing apparatus, and the data processing apparatus sends the cache data to the PC. The PC extracts thumbnail images and EXIF data from the received cache data. Therefore, the data processing apparatus does not need to extract thumbnail images, etc.

20 Claims, 18 Drawing Sheets

(56) References Cited

FOREIGN PATENT DOCUMENTS

| JP | 2003-108976 | 4/2003 |
|----|-------------|--------|
| JP | 2003-153187 | 5/2003 |
| JP | 2005-24827 | 1/2005 |
| JP | 2005-094056 | 4/2005 |
| JP | 2005-123928 | 5/2005 |
| JP | 2006-85377 | 3/2006 |
| WO | WO 2006/030958 | 3/2006 |

* cited by examiner

F I G. 6
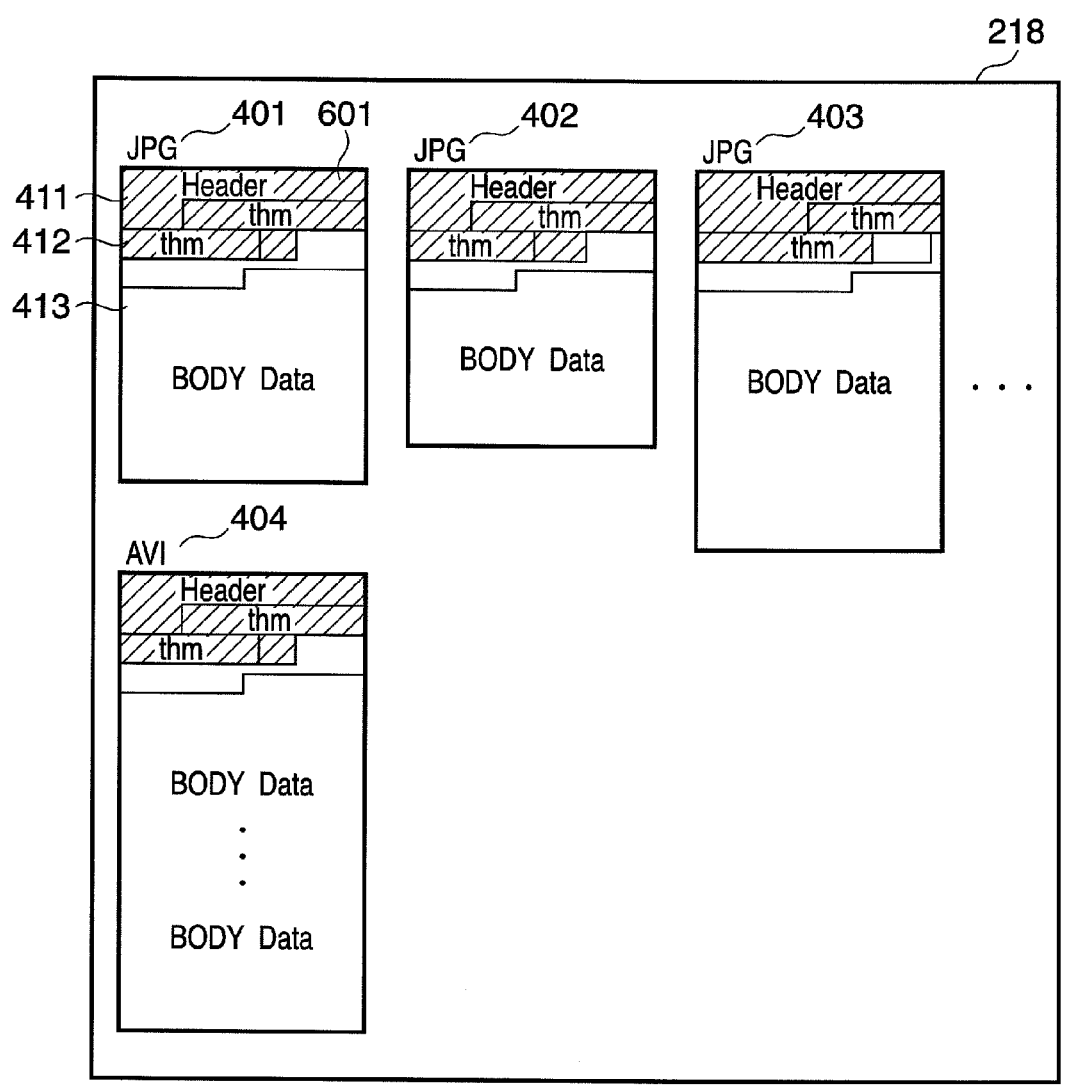

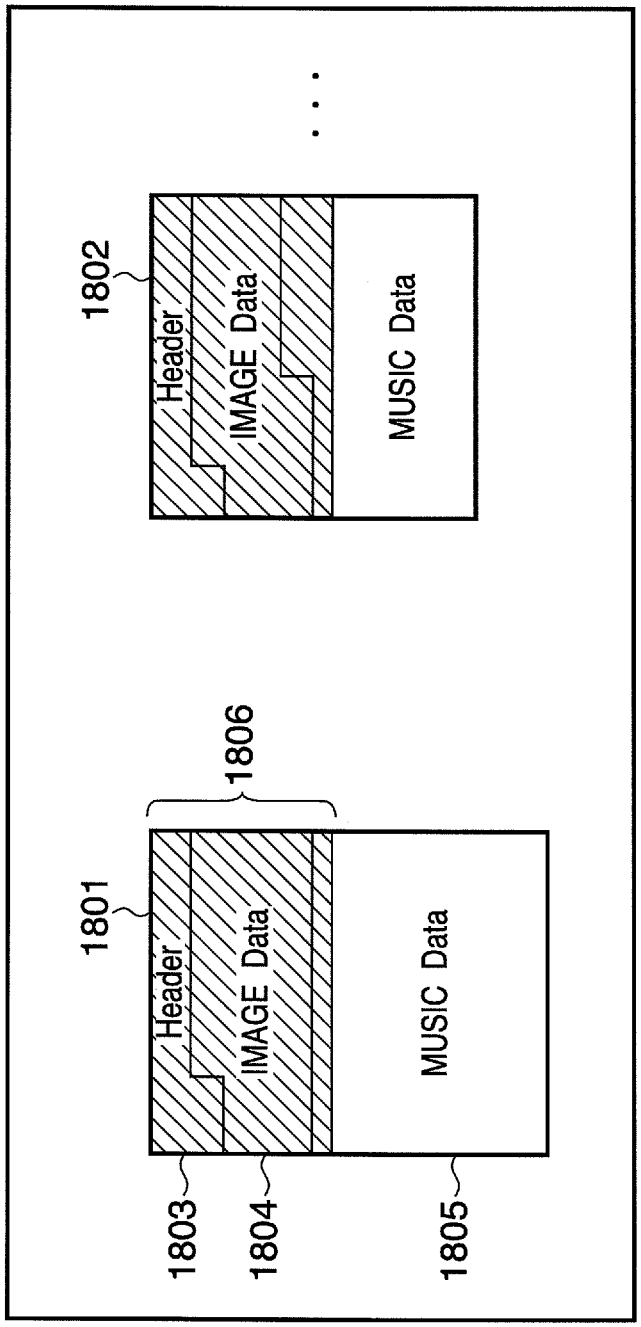

DATA PROCESSING APPARATUS AND METHOD THEREOF, AND INFORMATION PROCESSING APPARATUS AND METHOD THEREOF

TECHNICAL FIELD

The present invention relates to a data processing apparatus which transfers data to an external apparatus, and a method thereof, and to an information processing apparatus which requests an external apparatus to transfer data, and a method thereof.

BACKGROUND ART

There is known a technology of transferring images from a data processing apparatus such as a digital camera to an information processing apparatus such as a PC (personal computer). In order to show data concerning the survey of images stored in a digital camera to a user, there is known a technique of displaying on a PC, in thumbnail format, images stored on the digital camera. For example, Japanese Patent Laid-Open No. 2005-123928 discloses a digital camera which extracts only thumbnail images from stored images and transfers them.

In order for a PC to acquire thumbnail images from a digital camera, it is necessary for the following four steps to be carried out according to a PTP (Picture Transfer Protocol).

(1) The digital camera generates a list containing directory and file information of a storage medium containing stored images. A file refers mainly to an image file, but other file types (e.g., audio files) may be included.

(2) The PC refers to the list and sends a request to the digital camera to transfer the necessary thumbnail images.

(3) The digital camera extracts thumbnail images from image files in response to receiving the transfer request from the PC, and sends the thumbnail images to the PC.

(4) The number of times the above processes (2) and (3) are repeated equals the number of thumbnail images required by the PC.

However, if a PC attempts to acquire a thumbnail image by conventional methods, there arises the problem of large overhead involved in transmission. For example, if 1000 thumbnail images are to be acquired, it is necessary for a PC and a digital camera to repeat the above processes (2) and (3) 1,000 times. This requires a long period of time.

In addition, computing units of a digital camera are often configured to be relatively slow in order to limit power consumption and costs. Consequently, it takes a relatively long time for such a digital camera to extract thumbnail images from image files.

As a result, there is the problem that a long period of time is required for all thumbnail images required by a PC to be extracted and displayed to a user.

Thus, it takes a long period of time for a portable data processing apparatus such as a digital camera to extract specific data from files. Consequently, there is a considerable delay until the data is displayed to a user.

The present invention is provided in view of this situation, and provides a technology for reducing the amount of time required for an information processing apparatus to acquire thumbnail images from a data processing apparatus and display them to a user.

DISCLOSURE OF INVENTION

According to one aspect of the present invention, a data processing apparatus comprises:

an acquiring unit adapted to acquire fixed length data from each of a plurality of files so that variable length data inside each of the plurality of files is included, wherein the size of the variable length data differs from file to file;

a storage unit adapted to store fixed length data acquired from the plurality of files;

a receiving unit adapted to receive a transfer request for file information from an external apparatus; and a transfer unit adapted to transfer to the external apparatus a plurality of fixed length data stored in the storage unit, in response to the received transfer request.

According to another aspect of the present invention, a data processing apparatus, comprises:

an acquiring unit adapted to acquire fixed length data from a file so that variable length data in the file is included, wherein the size of the variable length data differs from file to file, and the acquiring unit acquires the fixed length data without identifying a position of the variable length data in the file;

a receiving unit adapted to receive a transfer request for file information from an external apparatus; and a transfer unit adapted to transfer the acquired fixed length data to the external apparatus in response to the transfer request.

According to still another aspect of the present invention, an information processing apparatus, comprises:

a first request unit adapted to request file information from an external apparatus;

a receiving unit adapted to receive a plurality of fixed length data sent from the external apparatus in response to the request; and an extraction unit adapted to extract thumbnail images from each of the plurality of fixed length data.

According to yet another aspect of the present invention, a data processing method, comprises steps of:

acquiring fixed length data from each of a plurality of files so that variable length data inside each of the plurality of files is included, wherein the size of the variable length data differs from file to file;

storing fixed length data acquired from the plurality of files;

receiving a transfer request for file information from an external apparatus; and transferring to the external apparatus a plurality of fixed length data stored in the step of storing in response to the received transfer request.

According to still yet another aspect of the present invention, a data processing method, comprises steps of:

acquiring fixed length data from a file so that variable length data in the file is included, wherein the size of the variable length data differs from file to file, and in the step of acquiring the fixed length data, the fixed length data is acquired without identifying a position of the variable length data in the file;

receiving a transfer request for file information from an external apparatus; and transferring the acquired fixed length data to the external apparatus in response to the transfer request.

According to yet still another aspect of the present invention, an information processing method, comprises steps of:

requesting file information from an external apparatus;

receiving a plurality of fixed length data sent from the external apparatus in response to the request; and extracting thumbnail images from each of the plurality of fixed length data.

According to still yet another aspect of the present invention, there is provided with a computer program stored in a computer-readable storage medium that causes a computer to execute steps of:

acquiring fixed length data from each of a plurality of files so that variable length data inside each of the plurality of files is included, wherein the size of the variable length data differs from file to file;

storing fixed length data acquired from the plurality of files;

receiving a transfer request for file information from an external apparatus; and transferring to the external apparatus a plurality of fixed length data stored in the step of storing in response to the received transfer request.

According to yet still another aspect of the present invention, there is provided with a computer program stored in a computer-readable storage medium that causes a computer to execute steps of:

acquiring fixed length data from a file so that variable length data in the file is included, wherein the size of the variable length data differs from file to file, and in the step of acquiring the fixed length data, the fixed length data is acquired without identifying a position of the variable length data in the file;

receiving a transfer request for file information from an external apparatus; and transferring the acquired fixed length data to the external apparatus in response to the transfer request.

According to still yet another aspect of the present invention, there is provided with a computer program stored in a computer-readable storage medium that causes a computer to execute steps of:

requesting file information from an external apparatus;

receiving a plurality of fixed length data sent from the external apparatus in response to the request; and extracting thumbnail images from each of the plurality of fixed length data.

Further features of the present invention will become apparent from the following description of exemplary embodiments (with reference to the attached drawings).

BRIEF DESCRIPTION OF DRAWINGS

FIG. 6 is a diagram showing an example of how header information and thumbnail images do not fit into fixed length areas due to the data sizes of the fixed length areas being small.

FIG. 18 is a diagram showing the configuration of music files stored in a storage medium of a music player.

BEST MODE FOR CARRYING OUT THE INVENTION

Preferred embodiments of the present invention will now be described with reference to attached drawings. Each embodiment described below will be helpful in understanding a variety of concepts from the generic to the more specific.

It should be noted that the technical scope of the present invention is defined by claims, and is not limited by each embodiment described below. In addition, all combinations of the features described in the embodiments are not always indispensable for the present invention.

First Embodiment

System Configuration

Figure 1:
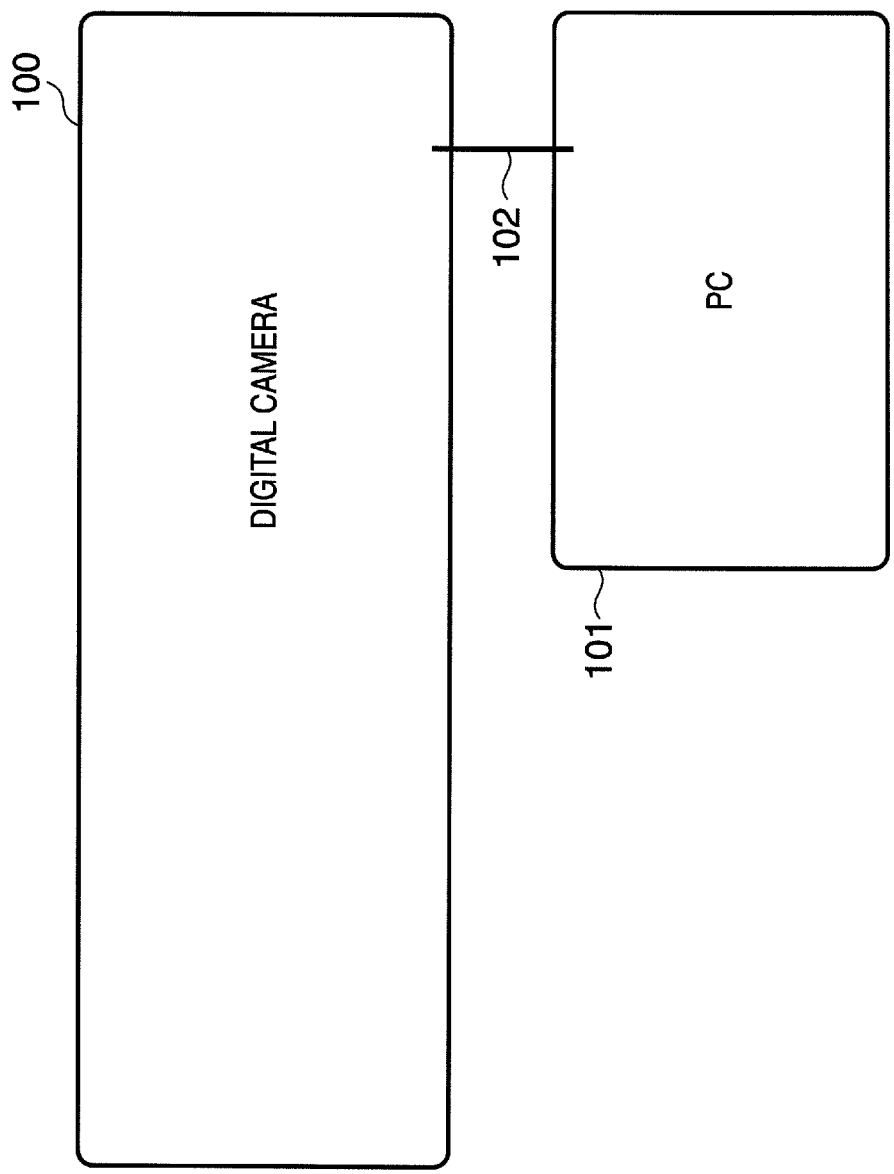
FIG. 1 is a block diagram showing the system configuration according to a first embodiment.

FIG. 1 is a block diagram showing the system configuration of a first embodiment of the present invention. In the present embodiment, a digital camera 100, which is an example of a data processing apparatus, is connected to a PC 101, which is an example of an information processing apparatus, through a communication cable 102. Further, the PC 101 acquires thumbnail images from a digital camera 100, and shows them to a user.

Moreover, the present embodiment mainly describes the PC 101 acquiring and displaying thumbnail images, but the present embodiment can also be applied to the concept of acquiring and displaying EXIF data of image files instead of thumbnail images. EXIF data is data contained in image file headers which are in compliance with EXIF standards, and contains data such as pixel count and shooting date and time.

Application programs enabling communication with the digital camera 100 in accordance with PTP are installed in the PC 101.

The communication cable 102 is any component which may send and receive data according to PTP. For example, a USB cable may be used. Further, the connection between the PC 101 and the digital camera 100 need not be restricted to a wired connection, but can be achieved through a wireless interface in compliance with, for example, IEEE 802.11x (where x is a, b, g, etc.)

<Configuration of the Digital Camera 100 and the PC 101>

Figure 2:
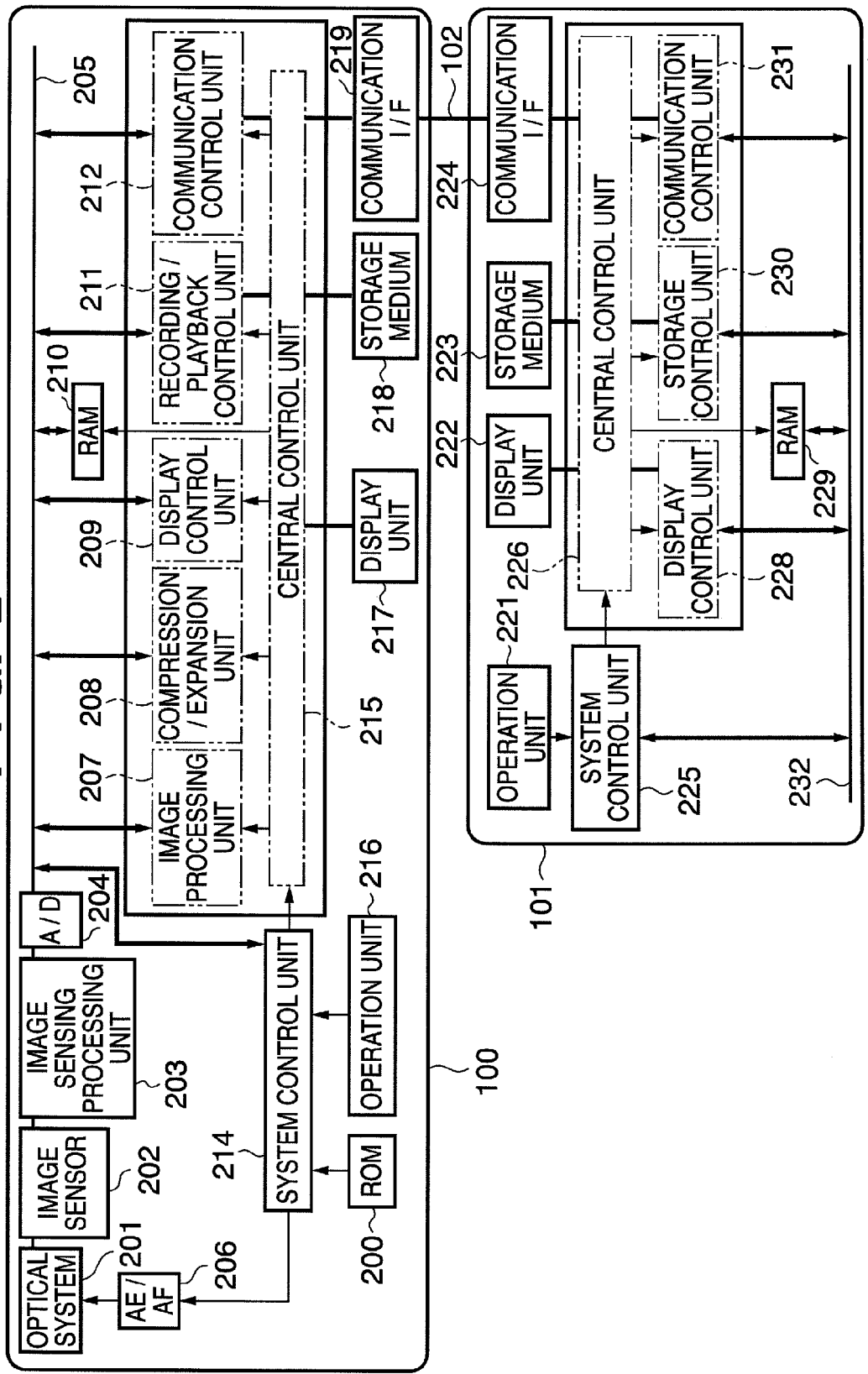
FIG. 2 is a function block diagram showing configurations of a digital camera and a PC (personal computer).

FIG. 2 is a function block diagram showing configurations of the digital camera 100 and the PC 101. The configuration of the digital camera 100 will first be explained.

An optical system 201 includes such components as an optical lens, and focuses light beams from an object onto an image sensor 202.

The image sensor 202 performs photoelectric conversion, which converts light beams from an object into electrical signals.

An image sensing processing unit 203 converts electrical signals acquired by the image sensor 202 into analog image signals.

An A/D converter 204 converts analog image signals acquired by the image sensing processing unit 203 to digital image signals (referred to simply as "image signals" hereinafter), and stores them in a RAM 210.

A data bus 205 is a path through which data is transmitted among components such as an image processing unit 207 and a system control unit 214 described below.

An AE/AF control unit 206 controls exposure, focus, etc., of the optical system 201.

The image processing unit 207 performs white balancing or luminance correction of image signals stored in the RAM 210.

A compression/expansion unit 208 compresses image signals processed by the image processing unit 207 by, for example, JPEG encoding. The compression/expansion unit 208 also expands image signals (referred to simply as "images" hereinafter). Compression rates of images can be set by a user by, for example, operating an operation unit 216.

A display control unit 209 controls the display of user interfaces (UI) and images on a display unit 217.

The RAM 210 temporarily stores data such as image signals.

A recording/playback control unit 211 performs functions such as writing images stored in the RAM 210 into a storage medium 218 as image files, and storing images extracted from the storage medium 218 in the RAM 210. Images read out from the storage medium 218 and stored in the RAM 210 are displayed on a display unit 217 by the display control unit 209.

A communication control unit 212 controls a communication I/F 219.

By executing programs stored in a ROM 200, the system control unit 214 controls the entire digital camera 100. Moreover, the system control unit 214 generates an image file by adding additional data such as a header and thumbnail image to an image compressed by the compression/expansion unit 208. A thumbnail image is generated by components such as the compression/expansion unit 208 and the system control unit 214. Moreover, the system control unit 214 has a function of switching the digital camera 100 into a power saving state. When the digital camera 100 is in a power saving state, a number of functions of the digital camera 100 are switched off, resulting in lower electrical power consumption.

A central control unit 215 controls the image processing unit 207, the compression/expansion unit 208, the display control unit 209, the recording/playback control unit 211, etc. Functions of these processing units and control units can be implemented by the system control unit 214 executing programs or by dedicated hardware.

The ROM 200 stores programs for controlling the digital camera 100 and data (e.g., model name) related to the digital camera 100. Moreover, the ROM 200 stores image data corresponding to a setting menu displayed in the display unit 217.

The operation unit 216 is a UI (user interface) for the user to operate the digital camera 100. The operation unit 216 has, for example, a power switch for turning ON or OFF the electrical power supply to the digital camera 100, a shutter button, and a menu button for displaying a setting menu on the display unit 217. The operation unit 216 also has an arrow button for moving a cursor displayed in the display unit 217 up, down, left, or right, as well as a SET button for making the digital camera 100 set or select images, items, or values. The shutter button can be in a half-pressed or fully-pressed state. When a shutter button is in a half-pressed state, the digital camera 100 executes AF (Auto Focusing) processing, AE (Auto Exposure) processing, etc. and when a shutter button is in a fully-pressed state, the digital camera 100 executes shooting of an image.

The display unit 217 is, for example, a liquid crystal display. The display unit 217 is controlled by the display control unit 209 and displays a variety of visual information, such as information concerning the digital camera 100 (e.g., set time), images, and GUI (graphical user interface).

The storage medium 218 stores image files and audio files. The storage medium 218 also has a directory for storing files. The storage medium 218 can be a removable medium or a fixed, built-in medium. The storage medium 218 is a non-volatile storage medium, and can hold contents of memory even when power supply has been cut.

The communication I/F 219 is a communication interface which includes, for example, a USB connecting terminal. The communication I/F 219 may be a wireless communication interface without a connecting terminal. The communication I/F 219 is capable of PTP-based communication.

Next, a configuration of the PC 101 will be described.

An operation unit 221 is a UI for operation of the PC 101 by the user, and comprises a keyboard, mouse, etc.

A display unit 222 comprises a liquid crystal display, and displays a UI and images according to instructions by a display control unit 228.

A storage medium 223 is a non-volatile storage medium such as an HDD (Hard Disk), and stores an OS (Operating System) of the PC 101 and applications related to the present embodiment.

A communication I/F 224 is a communication interface which includes, for example, a USB connecting terminal. The communication I/F 224 may be a wireless communication interface not having a connecting terminal. The communication I/F 224 can carry out PTP-based communication.

A system control unit 225 controls the entire PC 101 by executing an OS and applications stored in the storage medium 223.

A central control unit 226 controls the display control unit 228, a storage control unit 230, and a communication control unit 231, each of which is described below. The functions of these control units can be implemented by executing an OS or applications of the system control unit 225 or by dedicated hardware.

The display control unit 228 controls the display unit 222.

A RAM 229 is a volatile memory used as a work area when an OS (Operating System), applications, etc., are executed.

The storage control unit 230 controls the inputting and outputting of data to/from the storage medium 223.

The communication control unit 231 controls the communication I/F 224.

A data bus 232 is a data path through which data is transmitted between the display control unit 228, the RAM 229, etc.

<Modules Related to the Present Embodiment>

Figure 3:
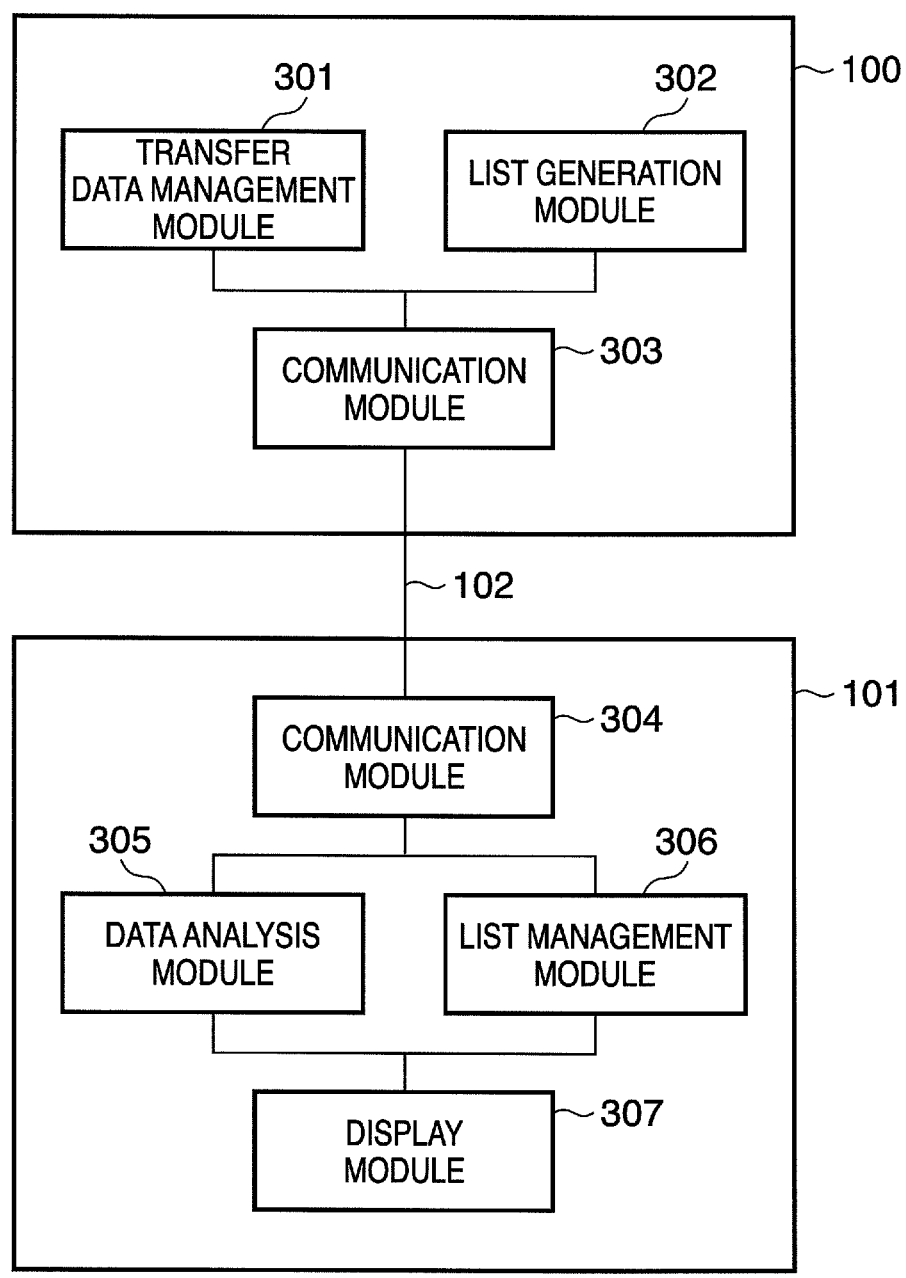
FIG. 3 is a block diagram showing functions of a digital camera and a PC as modules according to the first embodiment.

FIG. 3 is a block diagram showing functions of the digital camera 100 and the PC 101 of the present embodiment as modules. Each module described below is implemented by combining one or a plurality of function blocks of the digital camera 100 and the PC 101 shown in FIG. 2.

A transfer data management module 301 manages data transferred to the PC 101. As a concrete example, the transfer data management module 301 reads out files from the storage medium 218 and stores part of data contained in the files in the RAM 210.

A list generation module 302 generates a list indicating information related to directories and files stored in the storage medium 218. The list indicates the directory structure of the storage medium 218 as well as which files are stored in which directories.

A communication module 303 and a communication module 304 perform sending and receiving of data and commands between the digital camera 100 and the PC 101, as well as notifying other modules that the digital camera 100 and the PC 101 have been connected.

A data analysis module 305 analyzes data received from the digital camera 100 and extracts thumbnail images.

A list management module 306 notifies the data analysis module 305 of information related to image files from which thumbnail images are to be acquired, based on a list received from the digital camera 100. If the data analysis module 305 failed to acquire some of required thumbnail images, the list management module 306 requests the digital camera 100 via the communication module 304 to send the thumbnail images that were not acquired.

A display module 307 displays thumbnail images extracted by the list management module 306.

Moreover, the data analysis module 305 may acquire EXIF data (or part of EXIF data) instead of thumbnail images. In this case, the list management module 306 notifies the data analysis module 305 of information related to image files from which EXIF data should be acquired based on a list received from the digital camera 100. If the data analysis module 305 failed to acquire dome of required EXIF data, a request to send the EXIF data that were not acquired is made to the digital camera 100 via the communication module 304. Then, the display module 307 displays EXIF data extracted by the list management module 306.

<Configuration of Image Files>

Figure 4:
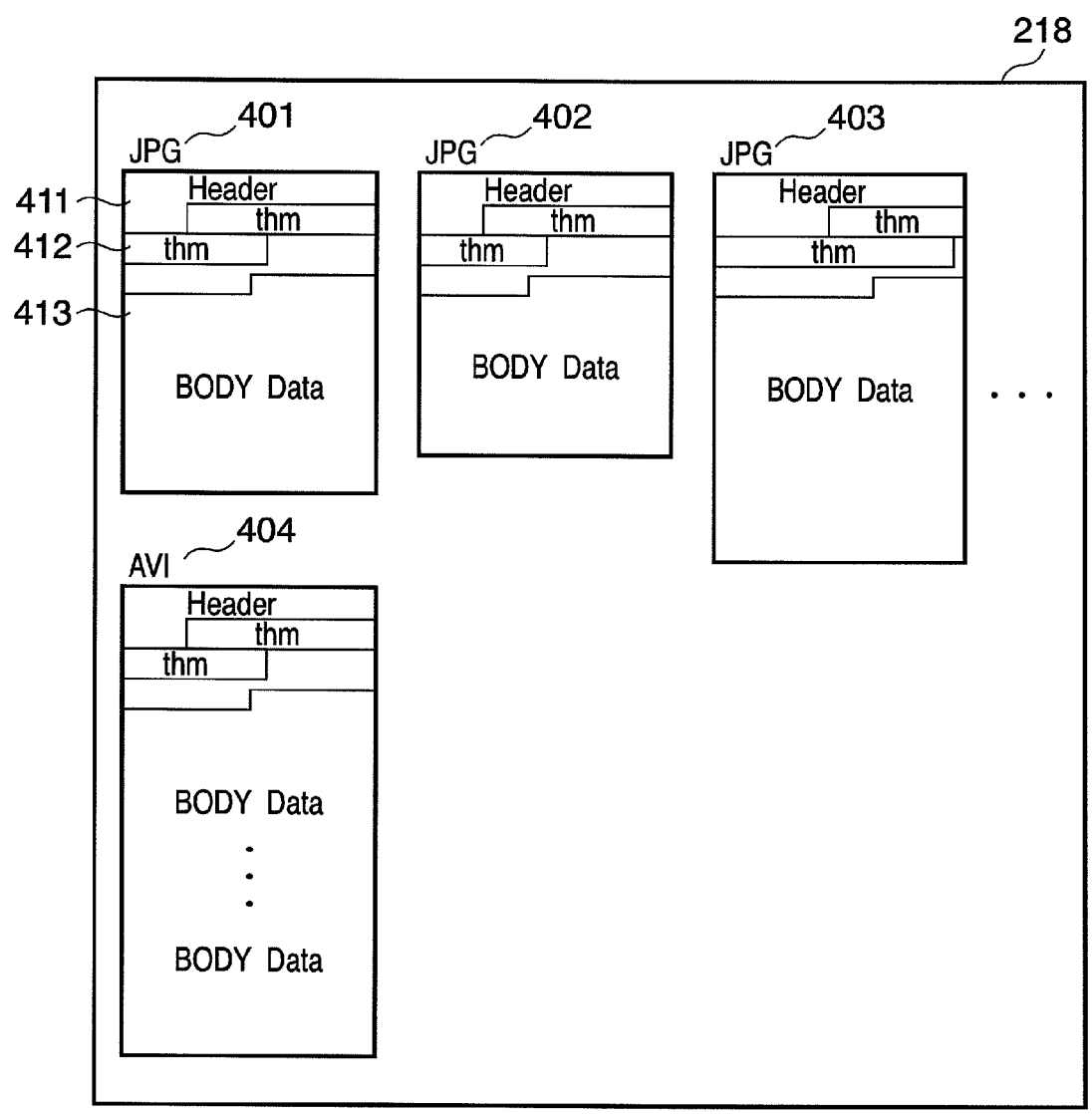
FIG. 4 is a diagram showing configurations of image files stored in a storage medium of a digital camera.

FIG. 4 is a diagram showing a configuration of image files stored in the storage medium 218. As shown in the diagram, the storage medium 218 stores image files 401 through 403, which include JPEG still images, and image file 404, which includes video in AVI format. In addition, although not shown in the drawings, the storage medium 218 may also store other files such as audio files.

The image files 401 through 404 include as components a header information 411, a thumbnail image 412, and a main image 413. Data sizes of the header information 411, the thumbnail image 412, and the main image 413 change according to the content of stored images. In other words, the size of the data differs from one image file to another.

Index information of the image file 401 is stored in the header information 411. By moving the pointer according to this index information, the PC 101 and the digital camera 100 can access to the thumbnail image 412 and the main image 413.

<Fixed Length Area 501>

Figure 5:
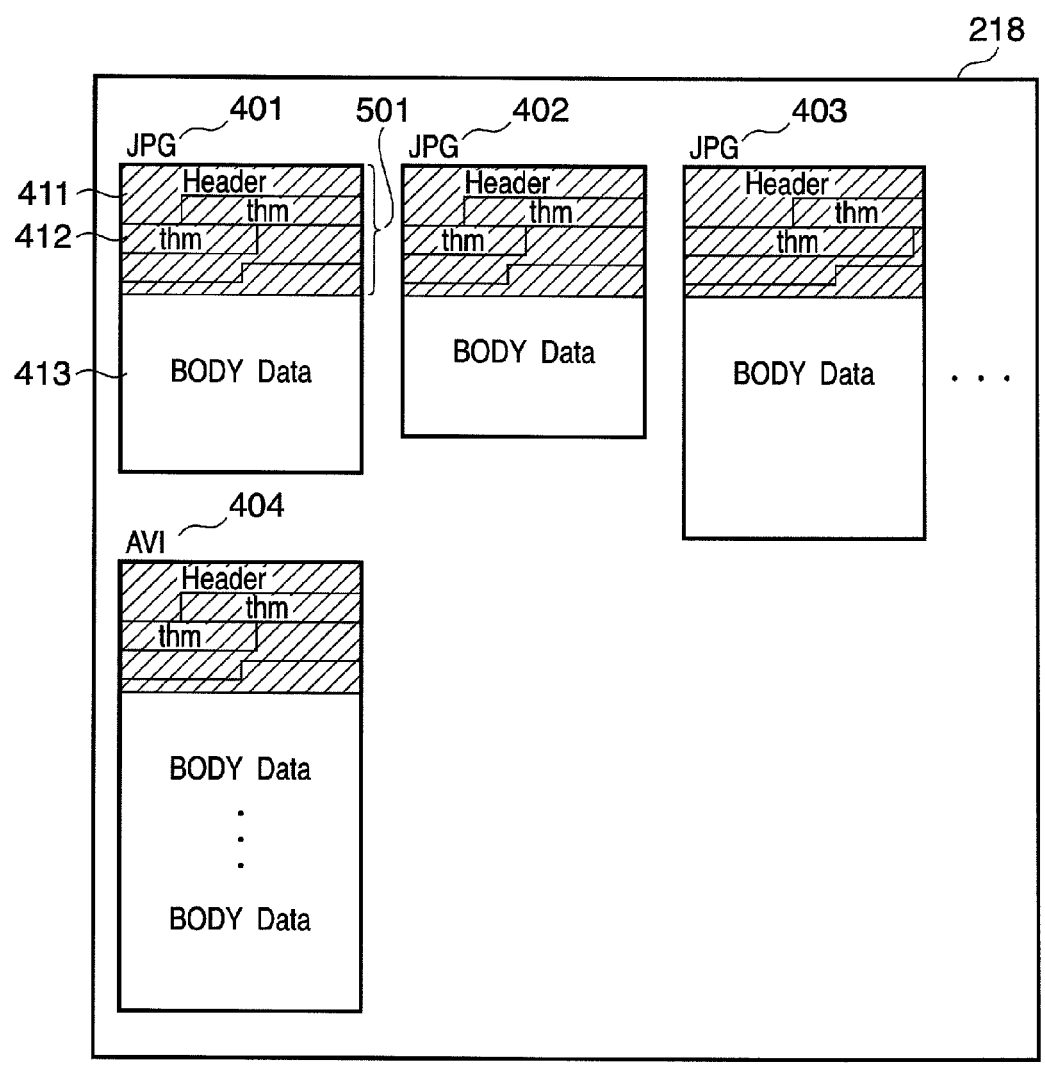
FIG. 5 is a diagram showing, in image files stored in a storage medium of a digital camera, fixed length areas containing header information and thumbnail images with high probability.

FIG. 5 is a diagram showing a fixed length area 501 of an image file stored in the storage medium 218 which has a high probability of containing the header information 411 and the thumbnail image 412. The fixed length area 501 is a area of a common data size among all image files.

The data size of the fixed length area 501 can be set according to image capturing ability (number of pixels, compression ability, etc.), parameters at the time of shooting, etc., to, for example, 100 bytes. The data size can be calculated by the system control unit 214 at the time of starting the digital camera 100, or the data size can be stored in the ROM 200 at the time of manufacture of the digital camera 100. Moreover, the digital camera 100 can be configured in such a manner that the data size of the fixed length area 501 is changed according to instructions from the operation unit 216 and the PC 101.

As is apparent from FIG. 5, according to the present embodiment, the start point of the fixed length area 501 is set at the beginning of a file. However, the start point of the fixed length area is not limited to the beginning of the file. For example, it is possible to set the start point at a point that is not at the beginning of the file, and acquire fixed length data starting from that point. In addition, it is also possible to set the end part of the file as the start point, and to acquire fixed length data of a specific size in a direction towards the beginning of the file.

In the example of FIG. 5, the header information 411 and the thumbnail image 412 are included in the fixed length area 501 in all image files (the image files 401 through 404). Thus, it is possible for the PC 101 to extract the thumbnail image 412 from the fixed length area 501 if the fixed length area 501 is transferred to the PC 101.

FIG. 6 is a diagram showing an example in which there exists an image file in which the header information 411 and the thumbnail images 412 do not fit inside a fixed length area 601 (shaded area) due to the data size of the fixed length area 601 being small. FIG. 6 contains the same reference numerals for components common with FIG. 5, and therefore descriptions of those components will be omitted.

As shown in FIG. 6, each of the fixed length areas 601 of the image files 401, 402 and 404 contains the header information 411 and the thumbnail image 412. However, in the image file 403, only a part of the thumbnail image 412 fits inside the fixed length area 601.

Therefore, although the PC 101 can acquire the fixed length area 601 of the image file 403, the thumbnail image 412 cannot be extracted.

In this way, if the data size of the fixed length area 601 is too small (in this example, the data size of the fixed length area 601 is smaller than the data size of the fixed length area 501) or the data size of the header information 411 and the thumbnail image 412 is too large, the above problem arises.

However, according to the present embodiment, the PC 101 can again request thumbnail images from the digital camera 100 if the thumbnail images could not be acquired from the fixed length area 601, as explained by reference to the list management module 306 (FIG. 3).

<Principles Underlying the Present Embodiment>

The principles underlying the present embodiment will be explained with reference to FIG. 7 and FIG. 8.

Figure 7:
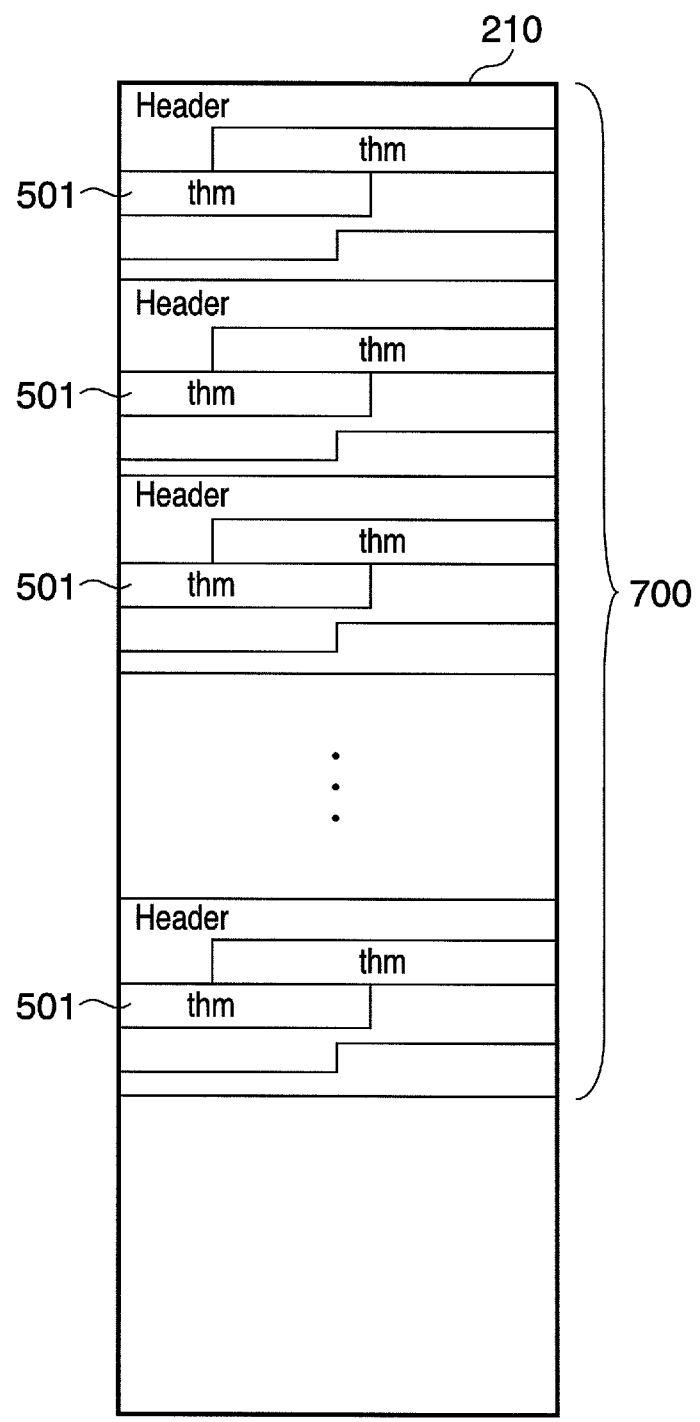
FIG. 7 is a diagram showing cache data stored in RAM after acquiring data to be transmitted to a PC from files stored in a storage medium of a digital camera.

FIG. 7 is a diagram showing a cache data 700 stored in the RAM 210, including data to be sent to the PC 101 acquired from files stored in the storage medium 218 of the digital camera 100.

The cache data 700 stores a plurality of the fixed length areas 501 (there are cases in which there is only one fixed length area 501) described above with reference to FIG. 5.

Each of the fixed length areas 501 include the header information 411 and the thumbnail image 412.

The cache data 700 is generated by the transfer data management module 301 (FIG. 3). In doing so, there is no need for the transfer data management module 301 to extract specific variable length data such as thumbnail images from the image files by analyzing the position of the data in the files. Consequently, the transfer data management module 301 can generate the cache data 700 at a high speed.

Moreover, as a general rule, the cache data 700 includes a plurality of the fixed length areas 501, so when the digital camera 100 receives a request for transfer of one of the cache data 700 from the PC 101, it is possible to transfer a plurality of thumbnail images at once. Hence, overhead related to the transfer request is reduced, and many thumbnail images are transferred to the PC 101 at high speed.

Also, whereas the RAM 210 has a relatively large capacity in order to temporarily record a plurality of pre-compression images, the fixed length area 501 has a relatively small data size as it need only include header information and thumbnail information. Consequently, the RAM 210 can usually store an extremely large number of the fixed length areas 501.

Figure 8:
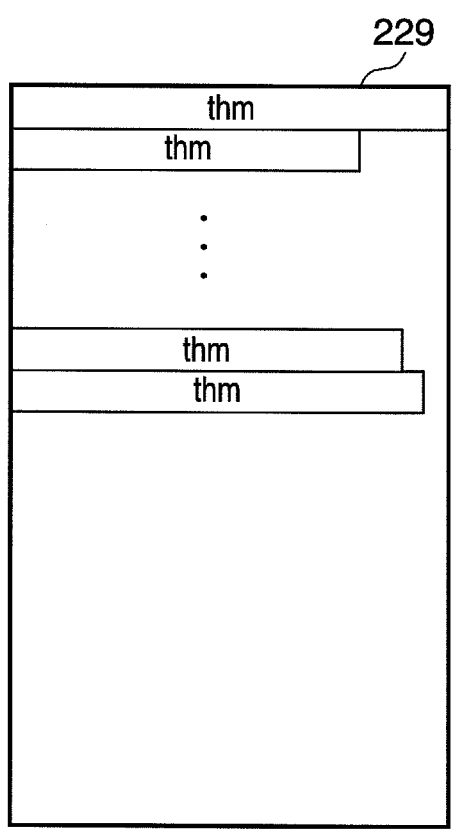
FIG. 8 is a diagram showing a result of storing thumbnail images extracted from cache data of a PC in RAM.

FIG. 8 is a diagram showing the result of extracting thumbnail images from the cache data 700 by the PC 101 and storing the thumbnail images in the RAM 229. The data analysis module 305 (FIG. 3) can analyze the cache data 700, identify the position of the thumbnail images from header information, and extract the thumbnail images. Thumbnail images extracted in this manner are displayed on the display unit 222 by the display module 307, so the user can rapidly know which images are stored in the storage medium 218.

<Details of the Embodiment>

The processing flow between connecting the digital camera 100 with the PC 101, and displaying thumbnail images on the display unit 222 of the PC 101 will be described in detail with reference to FIG. 9 and FIG. 10.

Figure 9:
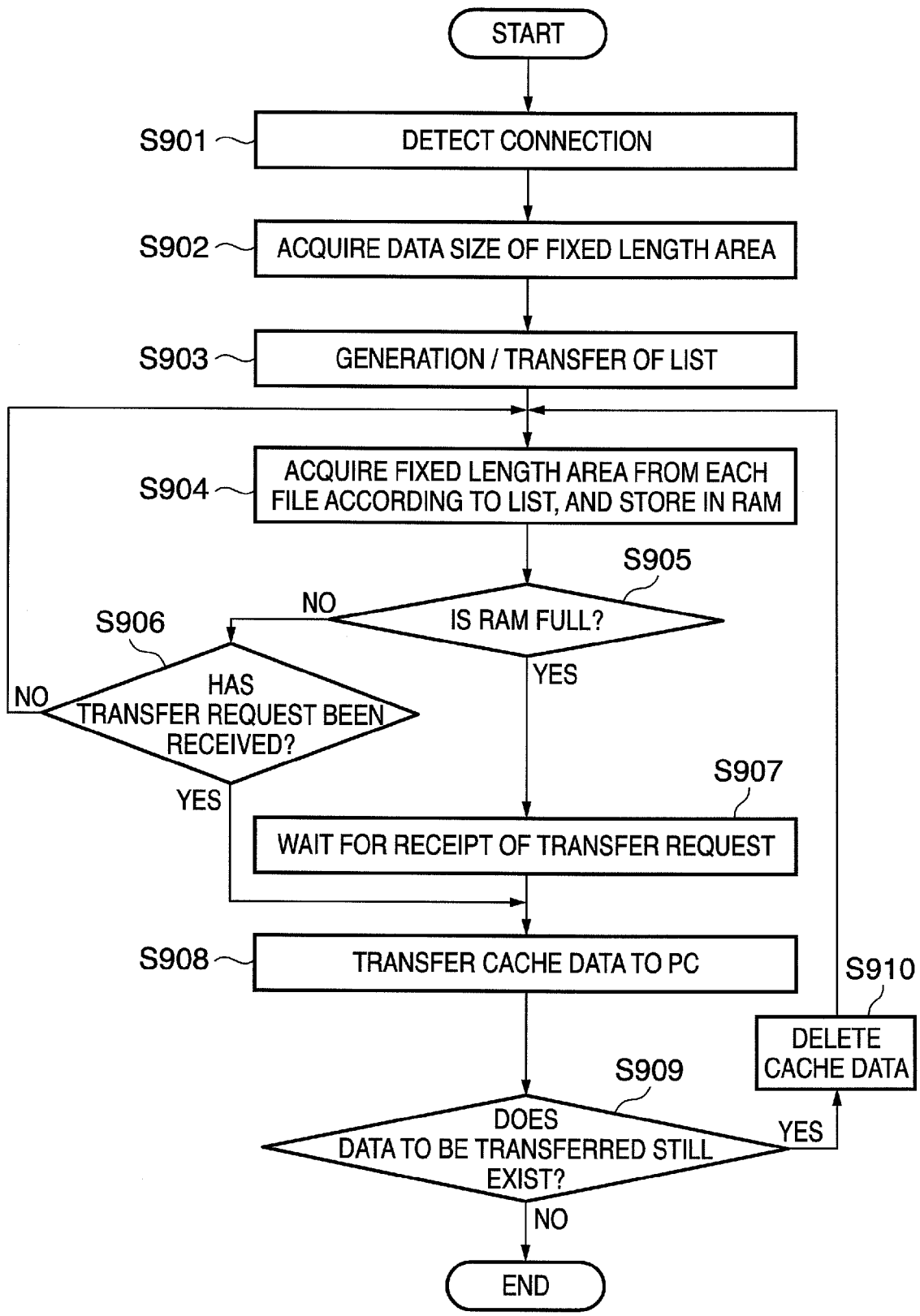
FIG. 9 is a flowchart showing the process involved in a digital camera transferring cache data to a PC.

FIG. 9 is a flowchart showing the processing flow of transferring the cache data 700 to the PC 101 by the digital camera 100.

At Step S901, the communication module 303 detects that the digital camera 100 is connected to the PC 101.

At Step S902, the transfer data management module 301 acquires the data size of the fixed length area. The data size of the fixed length area may be stored in advance in the ROM 200, as stated above, or may be determined, for example, by the system control unit 214 based on the image capturing ability of the digital camera 100.

At Step S903, the list generation module 302 generates a list showing directory and file information stored in the storage medium 218. The generated list is, for example, stored in the RAM 210. Moreover, the communication module 303 transfers the list to the PC 101.

At Step S904, the transfer management module 301 acquires, according to the list, data corresponding to the fixed length areas of specific files stored in the storage medium 218, stores the data in the RAM 210, and generates the cache data 700.

At Step S905, the transfer data management module 301 determines whether the capacity of the RAM 210 is full or not. If full, the process advances to Step S907; if not, to Step S906.

At Step S906, the communication module 303 determines whether a request for transfer of the cache data 700 from the PC 101 has been received (i.e., accepted). If the request has been received, the process advances to Step S908, and if not, the process returns to Step S904.

In this manner, by repeating the processes of Steps S904 through S906, data in a pre-determined area of fixed length (fixed length area) from files contained in the list are each successively recorded in the RAM 210.

Moreover, for files which do not include thumbnail images (e.g., audio files), the transfer data management module 301 may be configured to not store the fixed length areas in the RAM 210. Specifically, for example, the transfer data management module 301 may determine whether a file is an image file based on the extension of the file.

In addition, the order of files processed at Step S904 is determined by the results of the calculation, based on a list, by the digital camera 100 of the order in which thumbnail images are displayed by an application of the PC 101 based on a list. Alternatively, the display order of thumbnail images is set in advance in both the digital camera 100 and the PC 101.

At Step S907, the communication module 303 waits for a transfer request from the PC 101 to be received (accepted), and, after receipt, the process proceeds to Step S908.

Moreover, in the present embodiment, a transfer request from the PC 101 to the digital camera 100 is made through an extended command prescribed by PTP standards.

At Step S908, the communication module 303 transfers the cache data 700 to the PC 101.

At Step S909, the transfer data management module 301 determines by referring to the list whether data to be transferred has been sent to the PC 101 as the cache data 700. That is, it is determined if there exist unprocessed files whose fixed length areas should be stored in the RAM 210. If all data needed to be transferred has been transferred, processing is finished; otherwise, the process advances to Step S910.

A relatively long period of time is required for the PC 101 to be ready to send a transfer request after having received a list (Step S903). Since the RAM 210 has a sufficient capacity, it is typical for all of the required data to be transferred in one transfer.

At Step S910, the transfer data management module 301 deletes from the RAM 210 the cache data 700 transferred at Step S908.

Also, although not indicated in FIG. 9, the communication module 303 accepts instructions to change the data size of the fixed length areas from the PC 101, and the transfer data management module 301 can be configured to change the data size of the fixed length areas based on instructions.

Figure 10:
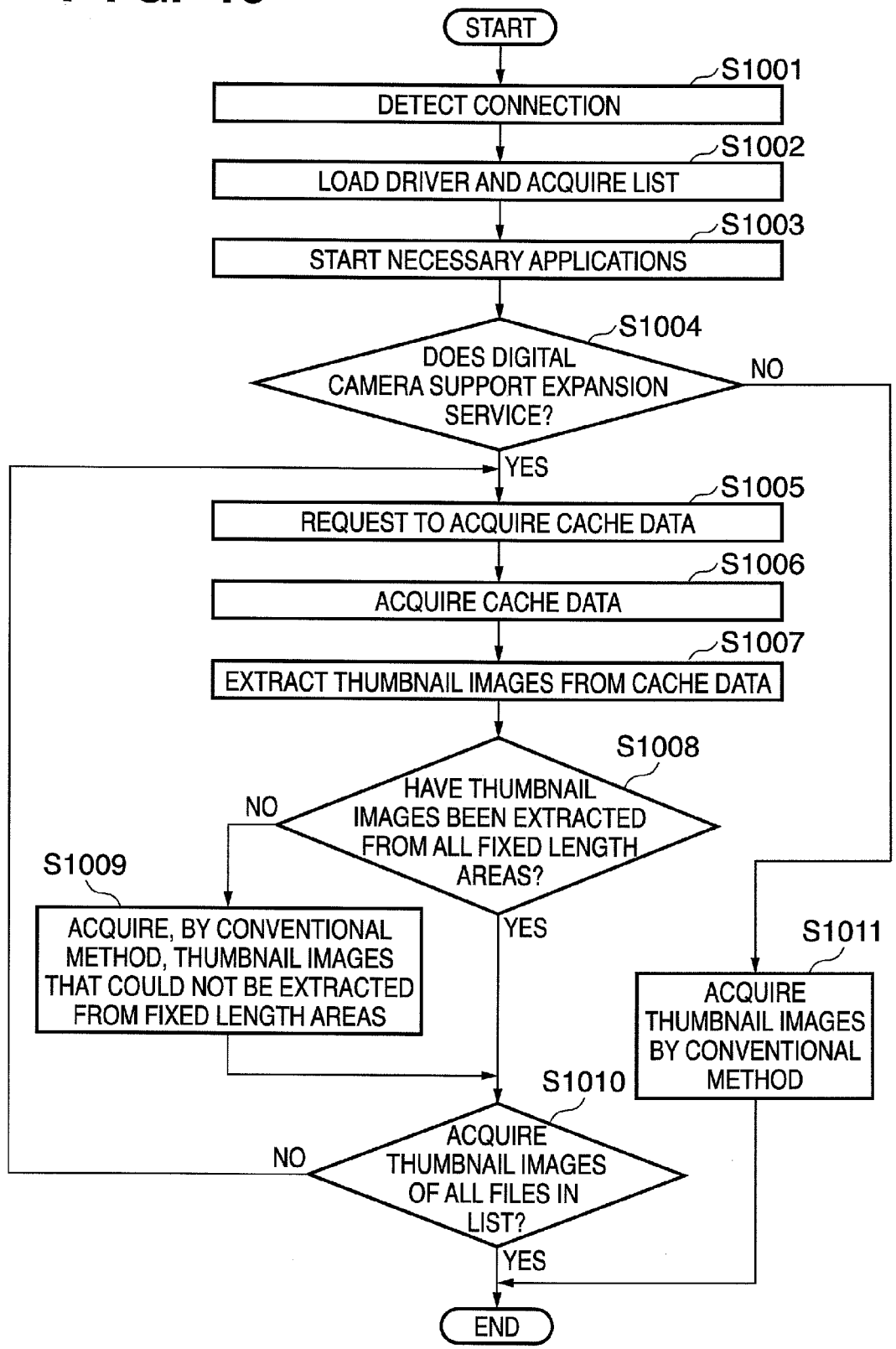
FIG. 10 is a flowchart showing the process involved in a PC acquiring cache data from a digital camera and extracting a thumbnail image from the cache data.

FIG. 10 is a flowchart showing the process by which the PC 101 acquires the cache data 700 from the digital camera 100 and extracts thumbnail images.

At Step S1001, the communication module 304 detects that the digital camera 100 has connected to the PC 101.

At Step S1002, the OS of the PC 101 loads a device driver for the digital camera 100. For example, in the case where the OS is Microsoft Windows (Registered Trademark), the WIA service loads a PTP driver after the OS recognizes the digital camera 100. Also, if the OS is Apple's Mac OS (Registered Trademark), when the OS recognizes the digital camera 100, the ICA service loads a PTP driver. In addition, the WIA and ICA services acquire attribute information (e.g., model number and image capturing abilities) and the list generated at Step S903.

At Step S1003, the system control unit 225 launches an application which can acquire thumbnail images from the digital camera 100 according to the present embodiment.

At Step S1004, the application launched at Step S1003 (referred to as simply "application" hereinafter) determines if the digital camera 100 supports the above function of the present embodiment (expansion services). If the connected digital camera 100 supports expansion services, the process advances to Step S1004, and if not, to Step S1011. At Step S1011, the application acquires thumbnail images from the digital camera 100 by the conventional method. The conventional method is the method described in steps (1) through (4) in the Background Art.

While the PC 101 executes the processes of Steps S1002 through S1004, the digital camera 100 repeats the processes of Steps S904 through S906, or waits for a transfer request at Step S907.

At Step S1005, in order to acquire information on image files containing thumbnail images, the communication module 304 requests the digital camera 100 to transfer the cache data 700.

At Step S1006, the communication module 304 acquires the cache data 700 from the digital camera 100, and gives it to the data analysis module 305.

At Step S1007, the data analysis module 305 extracts thumbnail images from the cache data 700, and stores them in the RAM 229, as indicated in FIG. 8.

At Step S1008, the data analysis module 305 determines whether thumbnail images have been successfully extracted from data in all of the fixed length areas contained in the cache data 700. The size of the thumbnail image is recorded at the beginning of the thumbnail image 412. Therefore, the data analysis module 305 makes a determination by comparing the size of the recorded thumbnail image and the size of the data that was actually extracted. If the extraction has been successful, the process proceeds to Step S1010, and, if not, to Step S1009. Note that, as shown in FIG. 6, if the header information 411 and the thumbnail image 412 do not fit inside the fixed length area 601, the data analysis module 305 fails in the extraction of thumbnail images.

At Step S1009, the communication module 304 acquires from the digital camera 100 by the conventional method the thumbnail images which it failed to acquire at Step S1007.

At Step S1010, the list management module 306 determines whether thumbnail images have been acquired from all files in the list. In other words, the list management module 306 determines whether there are any unprocessed files from which thumbnail images have not been acquired. The process is ended if thumbnail images have been acquired from all files. If not, the process returns to Step S1005, and the acquiring of cache data and extraction of thumbnail images is repeated until unprocessed files no longer exist. Note that the list management module 306 may be configured so that files in the list which do not contain thumbnail images (e.g., files other than image files) are not treated as unprocessed files.

Also, in Step S1008, in the case where the fraction of fixed length data from which thumbnail images could not be extracted exceeds the specified maximum value, the communication module 304 may request the digital camera 100 to enlarge the data size of the fixed length area. By contrast, if the fraction of fixed length data from which thumbnail images could not be extracted is below the specified minimum value, the communication module 304 may request the digital camera 100 to reduce the data size of the fixed length area. The data analysis module 305 determines the ratio of the fixed length data from which thumbnail images could not be extracted every time a pre-determined ratio of files contained in the list are processed (an attempt to extract thumbnail images has been made).

From the above process, it is possible for the PC 101 to store all required thumbnail images in the RAM 229, and for the display module 307 to display the required number of thumbnail images stored in the RAM 229.

As described above with reference to FIG. 9 and FIG. 10, in the present embodiment, the digital camera 100 generates transfer data (the cache data 700) while the PC 101 is readying to start up applications (Steps S1002 through S1004). Consequently, after finishing making ready the PC 101, the PC 101 can acquire data containing the required thumbnail images from the digital camera 100 by one or a relatively low number of data acquiring requests. Since the system control unit 225 of the PC 101 is generally faster in data processing speed than the system control unit 214 of the digital camera 100, the PC 101 can rapidly extract thumbnail images from the cache data 700. In this manner, it is possible to reduce the time required for the PC 101 to acquire thumbnail images from the digital camera 100 and to display them.

<Configuration of Transfer Data>

Figure 11:
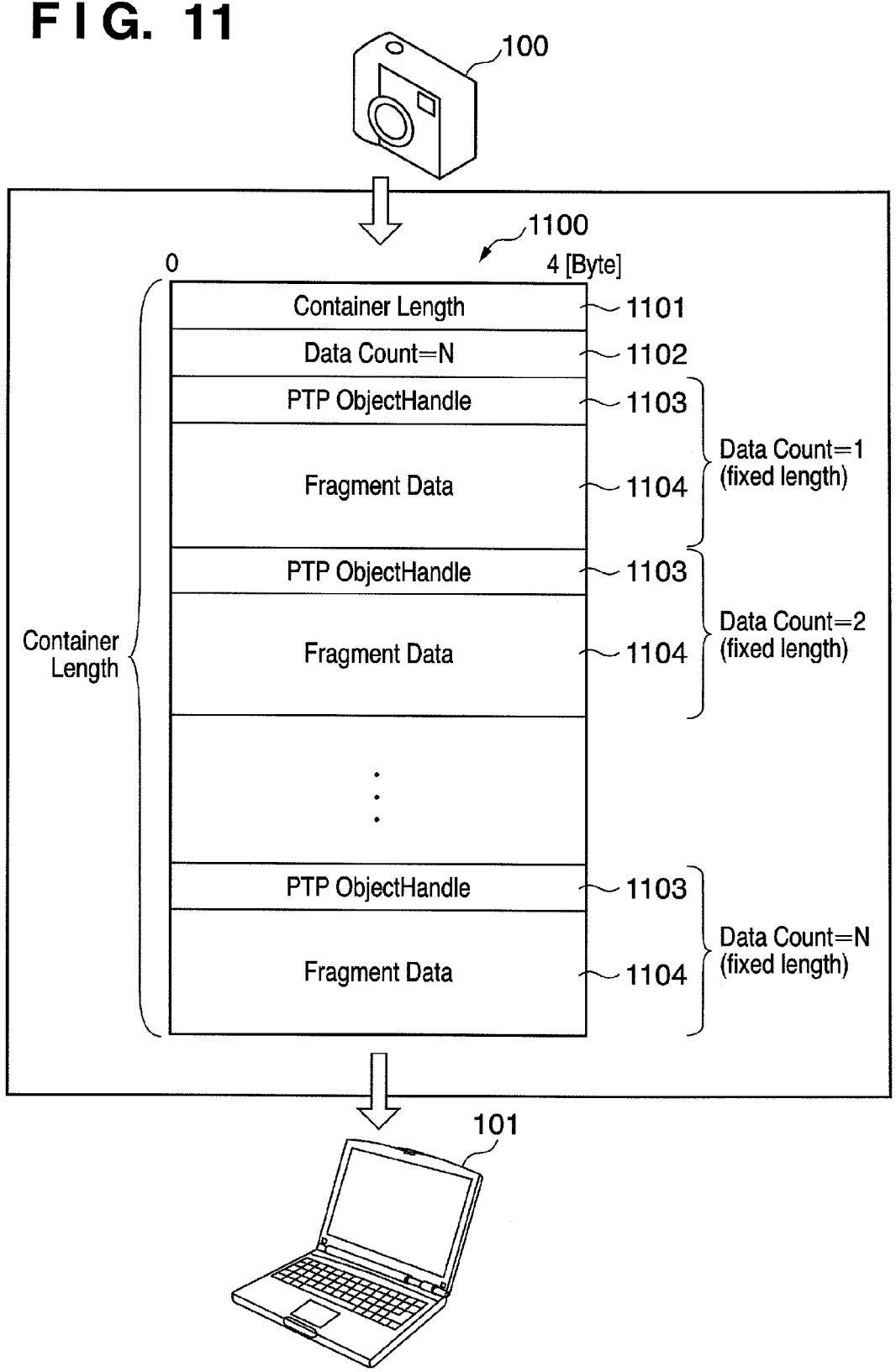
FIG. 11 is a diagram showing a configuration of data transferred between a communication module of a digital camera and a communication module of a PC.

FIG. 11 is a diagram showing the configuration of a transfer data 1100 to be transferred between the communication module 303 and the communication module 304. According to the description so far, it was described for simplicity that the cache data 700 is transferred between the communication module 303 and the communication module 304, but, actually, various data required for PTP is attached.

In FIG. 11, the data width of the transfer data 1100 is 4 bytes.

A container length 1101 is the size of the entire transfer data 1100.

A data count 1102 indicates the number of fixed length areas to be transferred (i.e., the number of fixed length data contained in transfer data). In FIG. 11, the number of fixed length areas to be transferred equals N. The data analysis module 305 can calculate the data size of the fixed length area based on the data count 1102 and the container length 1101.

A PTP Object Handle 1103 is an ID for identifying files based on the list.

A fragment data 1104 is a fixed length area. The data size of the fragment data 1104 is the data size of the fixed length area, and is equal to the data size acquired by the transfer data management module 301 at Step S902 of FIG. 9.

The PTP Object Handle 1103 together with the fragment data 1104 make up a single unit in which the data count is 1. The data count becomes 2 when the next PTP Object Handle 1003 and the fragment data 1104 are added. In this way, N units of the PTP Object Handle 1103 and the fragment data 1104 succeed.

Where transfer data 1100 is concerned, what is important is what file the fragment data being transferred corresponds to, and what the data size of the fragment data is.

Note that, for example, if it is desired, the order in which thumbnail images contained in image files in the list are transferred between the digital camera 100 and the PC 101 may be decided as part of the specifications. It will then be unnecessary to include the PTP Object Handle 1103 in the transfer data 1100.

In addition, if the PC 101 knows beforehand the data size of the fragment data, it will become unnecessary to include the data count 1102 in the transfer data 1100. In this case, the PC 101 can seek by calculation the data count 1102 based on the data size of the container length 1101 and the fragment data.

<Sequence Diagram>

Figure 12:
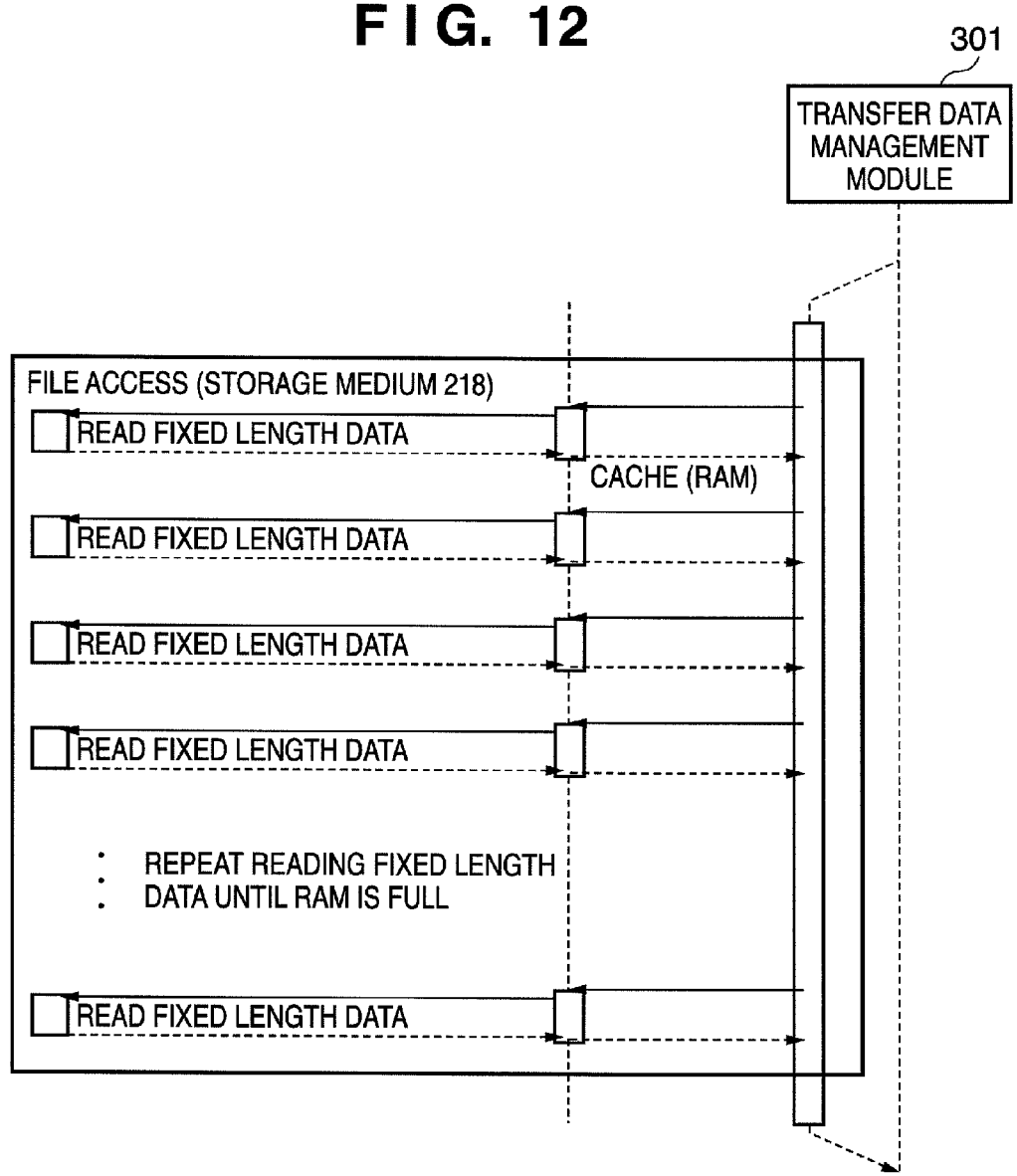
FIG. 12 is a diagram showing the sequence through which a transfer data management module of a digital camera stores fixed length area data in a RAM.

FIG. 12 is a diagram showing the sequence of the transfer data management module 301 storing the data of the fixed length area in the RAM 210.

As indicated in FIG. 12, the transfer data management module 301 accesses the files recorded in the storage medium 218 and reads outs fixed length areas. Then, the process is continued until the capacity of the RAM 210 is full. Of course, the process ends when the fixed length areas of all files have been read out.

Figure 13:
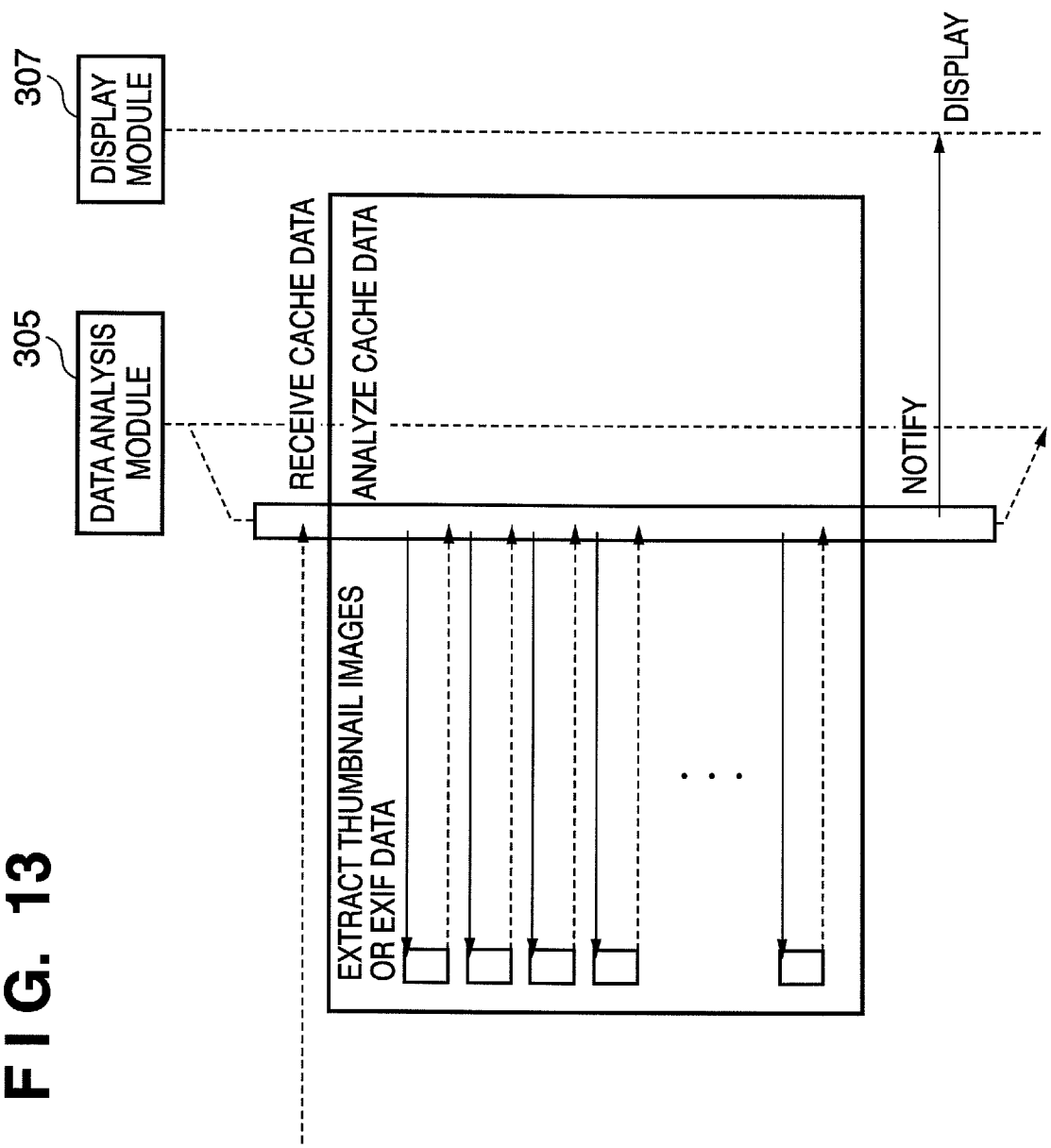
FIG. 13 is a diagram showing the sequence through which a data analysis module of a PC extracts thumbnail images or EXIF data from cache data.

FIG. 13 is a diagram showing the sequence of the data analysis module 305 extracting thumbnail images or EXIF data from the cache data 700.

As indicated in FIG. 13, the data analysis module 305 successively extracts from the cache data 700 thumbnail images or EXIF data, and stores them in the RAM 229. After extraction, the display module 307 displays the thumbnail images or EXIF data.

Figure 14:
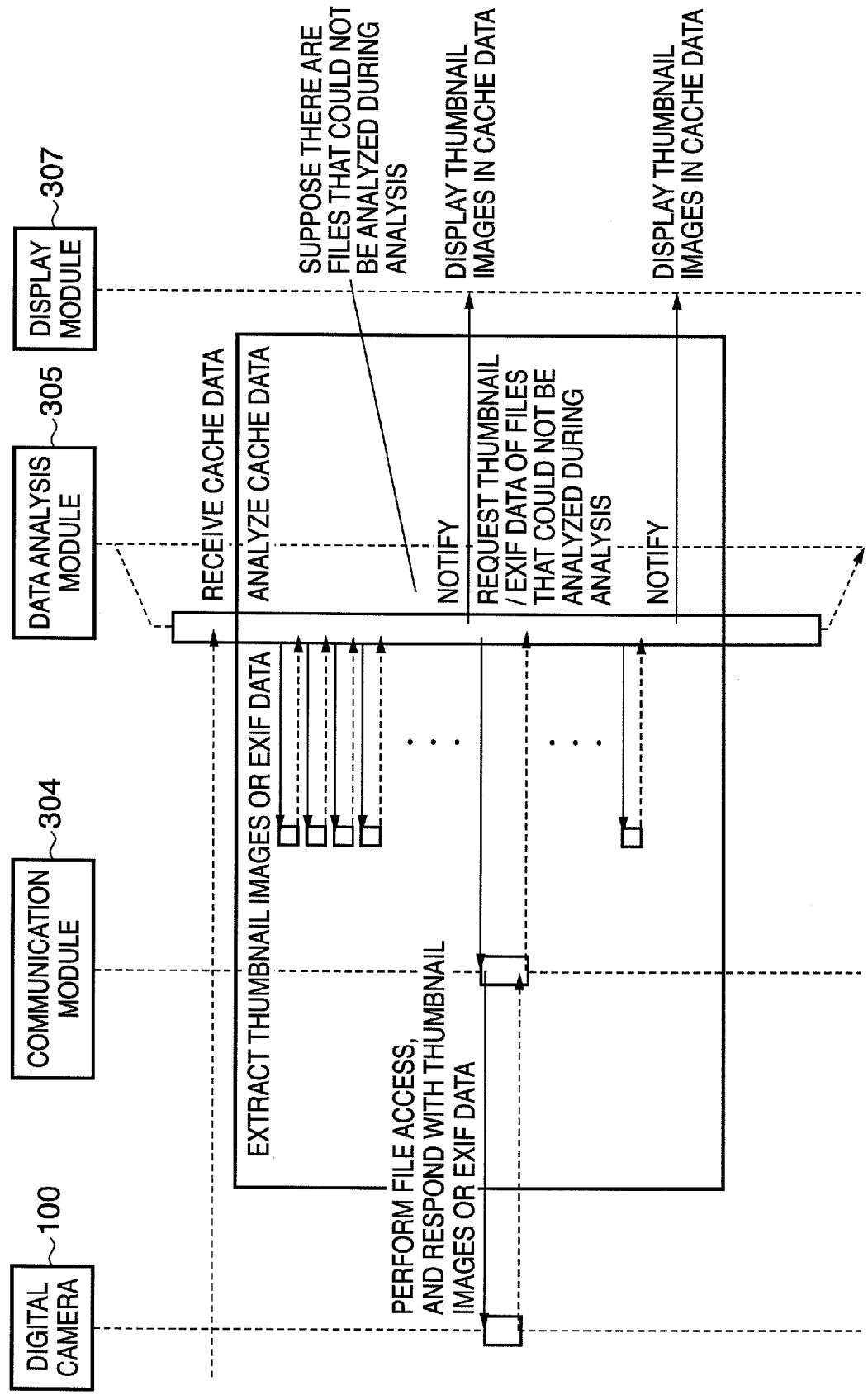
FIG. 14 is a diagram showing the sequence through which thumbnail images or EXIF data are again acquired from a digital camera in the case where the extraction from a specific fixed length area by a data analysis module of a PC has failed.

FIG. 14 is a diagram showing the sequence of re-acquiring from the digital camera 100 thumbnail images or EXIF data in the case where extraction of the thumbnail images or EXIF data by the data analysis module 305 from specific fixed length areas has failed.

As shown in FIG. 14, when the data analysis module 305 has failed to extract thumbnail images or EXIF data, the display module 307 displays thumbnail images extracted up to the present point in time. Moreover, the communication module 304 requests thumbnail images or EXIF data whose extraction had failed from the digital camera 100. Next, the data analysis module 305 resumes analysis of cache data.

Moreover, the timing with which the communication module 304 requests thumbnail images or EXIF data whose extraction had failed from the digital camera 100 is not limited to that shown in FIG. 14. For example, the communication module 304 can successively request thumbnail images or EXIF data whose extraction had failed from the digital camera 100 after the data analysis module 305 has analyzed all of the fixed length areas.

Figure 15:
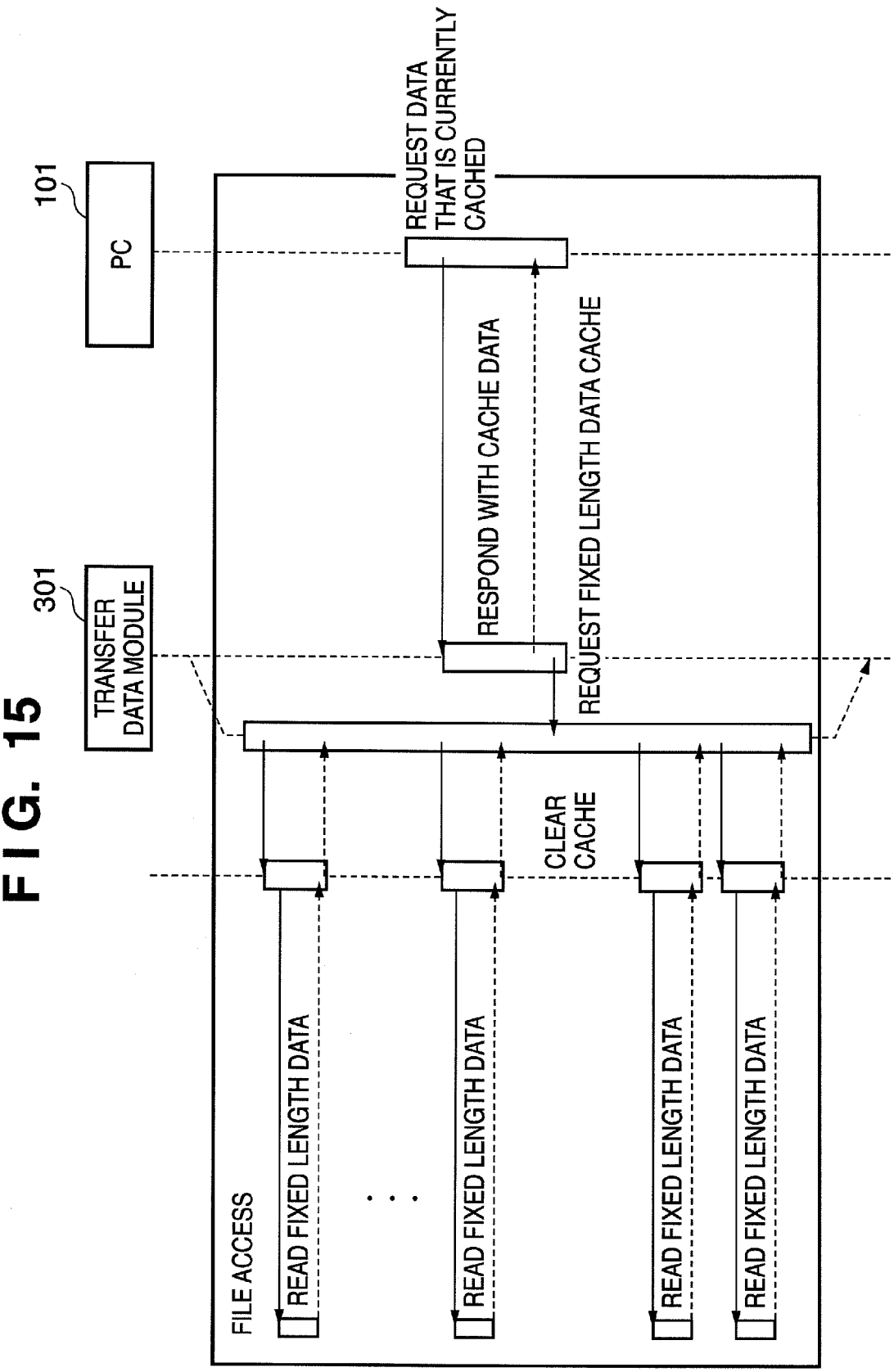
FIG. 15 is a diagram showing the sequence performed when a digital camera receives a request to acquire cache data from a PC, while repeating caching of fixed length areas.

FIG. 15 is a diagram showing the sequence upon receiving a request to acquire cache data from the PC 101 during the repeating of caching of the fixed length area by the digital camera 100 (the sequence corresponds to Step S906 in FIG. 9).

Details are as explained for FIG. 9, and will therefore be omitted where FIG. 15 is concerned. In short, the duration required for the PC 101 to acquire cache data can be minimized by preferentially processing the acquire request received from the PC 101.

As explained above, according to the present embodiment, the digital camera 100 stores as the cache data 700 data included in pre-determined areas of fixed length in stored files in the RAM 210. The storage of the cache data 700 occurs while the PC 101 is preparing to receive the cache data 700. The PC 101 sends the digital camera 100 a request to transfer the cache data 700, but since the storage of the cache data 700 occurs at high speed, it is possible to acquire the fixed length areas required by the PC 101 with a low number of transfer requests. The PC 101 (usually having a processing speed faster than that of the digital camera 100) extracts thumbnail images or EXIF data from the cache data 700. Therefore, the digital camera 100 does not need to extract thumbnail images, etc.

In this manner, overhead required for communication is reduced, thumbnail images are extracted at high speed, and the amount of time required for the PC 101 to acquire thumbnail images and present them to the user is reduced.

Second Embodiment

In the first embodiment, an example in which thumbnail images (or EXIF data) were extracted from image files and displayed was shown, but the applicable scope of the present invention is not restricted to image files. For example, it becomes possible to transfer audio files by complying with the MTP (Media Transfer Protocol), which is known as an expansion of PTP. Hence, the present embodiment describes connecting a music player for playing music data and a PC, and transferring music file-related data.

The description below will focus on features of the present embodiment. Descriptions that are identical to those in the first embodiment will be omitted.

Figure 16:
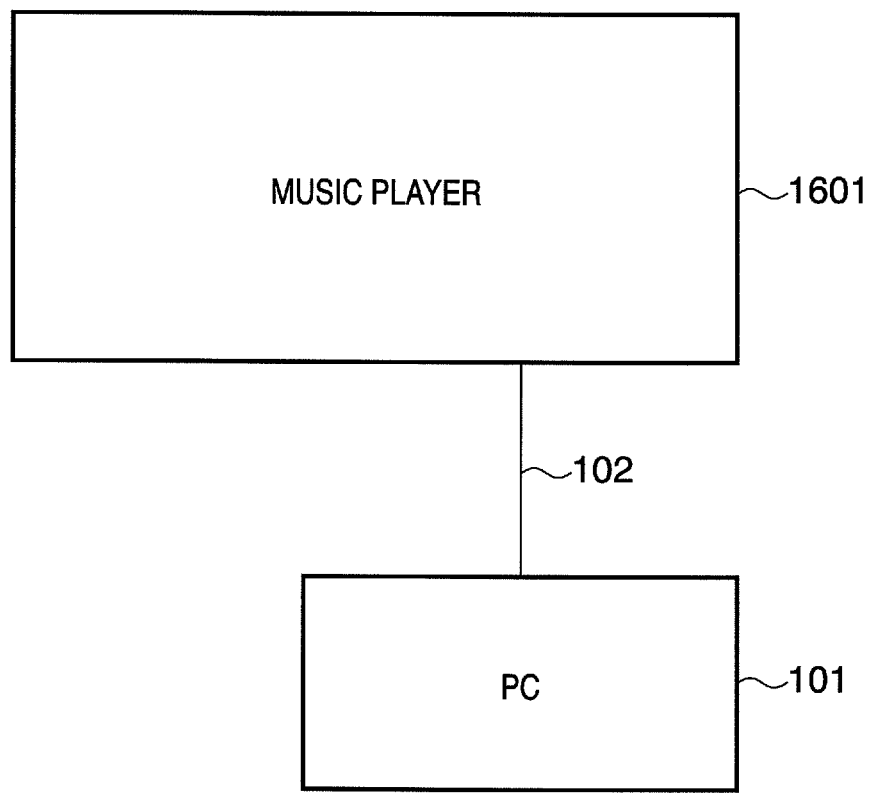
FIG. 16 is a block diagram showing the system configuration according to a second embodiment.

FIG. 16 is a block diagram showing the system configuration according to the second embodiment. In the present embodiment, a music player 1601 and the PC 101, which is an example of an information processing apparatus, are connected by the communication cable 102.

The music player 1601 is capable of processing not only music data, but also image data related to the music data. For example, it is possible to store and display images of music artists or image data for CD album jackets (hereinafter referred to as jacket images). These image data may be managed as files differing from audio files, or may be included inside the audio files.

Explained below as an example of the present embodiment is a case in which a jacket image for an audio file is displayed on the display of the PC 101 if the PC 101 and the music player 1601 are connected.

Figure 17:
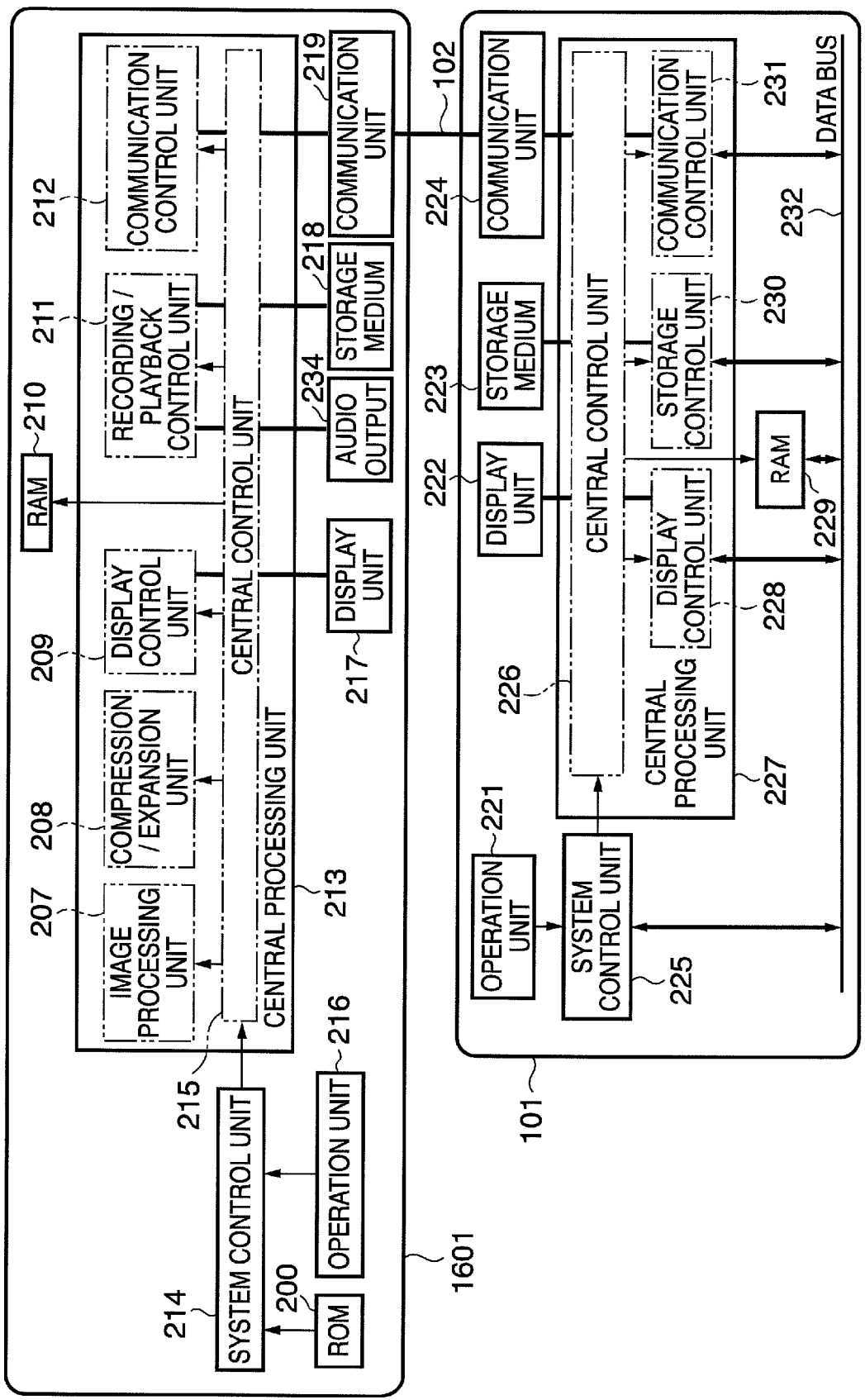
FIG. 17 is a function block diagram showing the configuration of a music player and a PC according to the second embodiment.

FIG. 17 is a function block diagram showing the configuration of the music player 1601 and the PC 101. Since the configuration of the PC 101 is the same as the configuration of the PC 101 in FIG. 2, explanations will be omitted.

Next, the configuration of the music player 1601 will be explained. The configuration of the music player 1601 is similar to that of the digital camera 100 shown in FIG. 2. Reference numerals for components of the music player 1601 that are identical to those in FIG. 2 have identical functions, so explanations will be omitted. The difference between the music player 1601 and the digital camera 100 is that the music player 1601 has an audio output unit 234. The music player 1601 outputs, through the audio output unit 234, music data read out from the storage medium 218.

FIG. 18 is a diagram showing the configurations of music files stored in the storage medium 218. The storage medium 218 stores, for example, music files 1801 and 1802, which are in MP3 format.

The music files 1801 and 1802 include header information 1803, image data 1804, and music data 1805. The image data 1804 is image data related to the music, and includes, for example, a jacket image. The jacket image may be a thumbnail image. The music data 1805 is data for the music itself. When playing music, the music data 1805 is played. The header information 1803, the image data 1804, and the music data 1805 each differ depending on the contained data. For example, as shown in FIG. 18, the sizes of the image data and music data differ between music files 1801 and 1802.

By transferring from among the music files having the configuration indicated in FIG. 18, a fixed length area 1806, which has been set in advance, to the PC, it is possible to shorten the time until transfer. The PC 101 then extracts the image data 1804 from the data received from the music player 1601, and displays it on the display unit 222.

Since the PC 101 is generally faster in the data processing speed of the CPU than the music player 1601, the time required until image data is displayed can be shortened by the PC 101 extracting image data.

According to the present embodiment, it is possible to shorten the time required to display a jacket image on a display unit 222 of the PC 101 after the user connects the music player 1601 to the PC 101.

As can be understood from the first and second embodiments, it is possible to implement the present invention by connecting the PC 101 to any data processing apparatus such as the digital camera 100 and the music player 1601. Moreover, the data requested by the PC 101 is not limited to thumbnail images, EXIF data, and jacket images. That is, the PC 101 can accept file-type and/or data-type instructions in advance, for example, via the operation unit 221. Further, the PC 101 can request a data processing apparatus for a specified type of data (e.g., thumbnail images) included in all of the specified types of files (e.g., image files) held by the data processing apparatus.

Other Embodiments

In order to realize processes of above-described embodiments, a storage medium on which program code of software realizing each function has been stored can be provided for a system or an apparatus. Then, by reading out and executing program code stored in the storage medium by that system or computer (or CPU or MPU) of the apparatus, it is possible to realize the functions of the above embodiments. In this case, the program code itself that was read out from the storage medium implements the functions of the above embodiments, and the storage medium on which that program code is stored comprises the present invention. The storage medium for supplying this program code can be, for example, a Floppy (Registered Trademark) disk, hard disk, optical disk, or magnetic optical disk. Alternatively, a CD-ROM, CD-R, magnetic tape, non-volatile memory card, or ROM can be used.

Moreover, it is not simply that the functions of each of the above embodiments are implemented when program code read out by the computer are executed. There is also included the case of the OS (operating system), etc., operating on a computer, performing a part or all of the actual processes based on instructions from the program code, and thereby implementing the functions of each of the above embodiments.

In addition, program code read out from a storage medium may be written into a memory equipped by a function expansion board inserted in a computer or a function expansion unit connected to a computer. The implementation of the above embodiments may thus also include the case of the CPU of that function expansion board or function expansion unit performing part or all of the actual processing according to instructions from the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-100396, filed on Mar. 31, 2006, which is hereby incorporated by reference herein in its entirety.

The invention claimed is:

1. A data processing apparatus comprising:
an acquiring unit configured to acquire fixed length data from each of a plurality of files so that variable length data inside each of the plurality of files is included, wherein the size of the variable length data differs from file to file;
a storage unit configured to store a plurality of fixed length data acquired from the plurality of files;
a receiving unit configured to receive a transfer request for file information from an external apparatus;
a generation unit configured to generate a single transfer data, wherein the single transfer data includes the plurality of fixed length data; and
a transfer unit configured to transfer to the external apparatus the plurality of fixed length data stored in the storage unit, as the single transfer data, without transferring an entirety of each of the plurality of files, in response to the received transfer request,
wherein thumbnail images in each of the plurality of fixed length data are extracted by an extraction unit of the external apparatus.

2. The data processing apparatus according to claim 1, further comprising:
an erase unit configured to erase data transferred by the transfer unit from the storage unit;
a determination unit configured to determine whether, out of the plurality of files, there exist any unprocessed files from which the fixed length data have not been acquired by the acquiring unit,
wherein the determination unit performs the determination when transfer by the transfer unit has been performed, the erase unit erases data transferred by the transfer unit from the storage unit when the unprocessed files have been determined to exist as a result of the determination, and the acquiring unit acquires the fixed length data from each of the unprocessed files.

3. The data processing apparatus according to claim 1, wherein the generation unit is a first generation unit, and the data processing apparatus further comprises:
a detection unit configured to detect that the external apparatus has been connected; and
a second generation unit configured to generate information for identifying the plurality of files by the external apparatus, in response to detection by the detection unit.

4. The data processing apparatus according to claim 1, further comprising:
a modification unit configured to modify a length of the fixed length data depending on user instructions, instructions from the external apparatus, or setting value.

5. The data processing apparatus according to claim 1, wherein the storage unit stores the fixed length data of only image files among the plurality of files.

6. The data processing apparatus according to claim 1, wherein the acquiring unit acquires as fixed length data, data in consecutive areas starting from the beginning of the file.

7. The data processing apparatus according to claim 1, wherein the variable length data contains at least one of either thumbnail image and exchangeable image format (EXIF) data.

8. The data processing apparatus according to claim 1, wherein the transfer data includes a number of the fixed length data contained in the transfer data.

9. An information processing apparatus comprising:
a first request unit configured to request file information from an external apparatus;
a receiving unit configured to receive a single transfer data including a plurality of fixed length data sent from the external apparatus, without receiving an entirety of each of a plurality of files corresponding to the plurality of fixed length data, in response to the request, wherein each of the plurality of fixed length data includes variable length data and the size of the variable length data differs from file to file; and
an extraction unit configured to extract thumbnail images from each of the plurality of fixed length data.

10. The information processing apparatus according to claim 9, further comprising:
a list acquiring unit configured to acquire, before the request by the first request unit, a list of files stored in the external apparatus;

a determination unit configured to determine, based on the list, whether there exist any unprocessed files from which thumbnail image was not extracted by the extraction unit; and an acquiring control unit configured to repeatedly execute, upon the determination unit determining that there exist unprocessed files, requesting by the first request unit and extraction of thumbnail images by the extraction unit, until the unprocessed files no long exist.

11. The information processing apparatus according to claim 9, further comprising:

a thumbnail acquiring unit configured to, in the case where files from which the thumbnail images could not be correctly extracted from the fixed length data exist, individually acquire thumbnail images of files from which the thumbnail images could not be correctly extracted.

12. The information processing apparatus according to claim 9, further comprising:

a second request unit configured to request the external apparatus to increase a length of the fixed length data in the case where a ratio of the files from which thumbnail images could not be correctly extracted from the fixed length data exceeds a predetermined upper limit.

13. The information processing apparatus according to claim 9, further comprising:

a third request unit configured to request the external apparatus to decrease a length of the fixed length data in the case where a ratio of the files from which thumbnail images could not be correctly extracted from the fixed length data is below a predetermined lower limit.

14. The information processing apparatus according to claim 9, further comprising:

a display unit configured to display at least one thumbnail image extracted by the extraction unit.

15. The information processing apparatus according to claim 9, wherein:

the first request unit requests EXIF data instead of thumbnail images; and the extraction unit extracts EXIF data instead of thumbnail images.

16. The information processing apparatus according to claim 9, wherein the extraction unit extracts the fixed length data based on a number of fixed length data contained in the transfer data.

17. A data processing method comprising steps of:

acquiring fixed length data from each of a plurality of files so that variable length data inside each of the plurality of files is included, wherein the size of the variable length data differs from file to file;

storing a plurality of fixed length data acquired from the plurality of files;

receiving a transfer request for file information from an external apparatus;

generating a single transfer data, wherein the single transfer data includes the plurality of fixed length data;

transferring to the external apparatus the plurality of fixed length data stored in the step of storing, as the single transfer data, without transferring an entirety of each of the plurality of files, in response to the received transfer request, wherein thumbnail images in each of the plurality of fixed length data are extracted by an extraction unit of the external apparatus.

18. An information processing method comprising steps of:

requesting file information from an external apparatus;

receiving a single transfer data including a plurality of fixed length data sent from the external apparatus, without receiving an entirety of each of a plurality of files corresponding to the plurality of fixed length data, in response to the request, wherein each of the plurality of fixed length data includes variable length data and the size of the variable length data differs from file to file; and extracting thumbnail images from each of the plurality of fixed length data.

19. A computer program stored in a computer-readable storage medium that causes a computer to execute steps of:

acquiring fixed length data from each of a plurality of files so that variable length data inside each of the plurality of files is included, wherein the size of the variable length data differs from file to file;

storing a plurality of fixed length data acquired from the plurality of files;

receiving a transfer request for file information from an external apparatus;

generating a single transfer data, wherein the single transfer data includes the plurality of fixed length data; and transferring to the external apparatus the plurality of fixed length data stored in the step of storing, as the single transfer data, without transferring an entirety of each of the plurality of files, in response to the received transfer request, wherein thumbnail images in each of the plurality of fixed length data are extracted by an extraction unit of the external apparatus.

20. A computer program stored in a computer-readable storage medium that causes a computer to execute steps of:

requesting file information from an external apparatus;

receiving a single transfer data including a plurality of fixed length data sent from the external apparatus, without receiving an entirety of each of a plurality of files corresponding to the plurality of fixed length data, in response to the request, wherein each of the plurality of fixed length data includes variable length data and the size of the variable length data differs from file to file; and extracting thumbnail images from each of the plurality of fixed length data.

* * * * *